United States Patent Office 3,519,807
Patented July 7, 1970

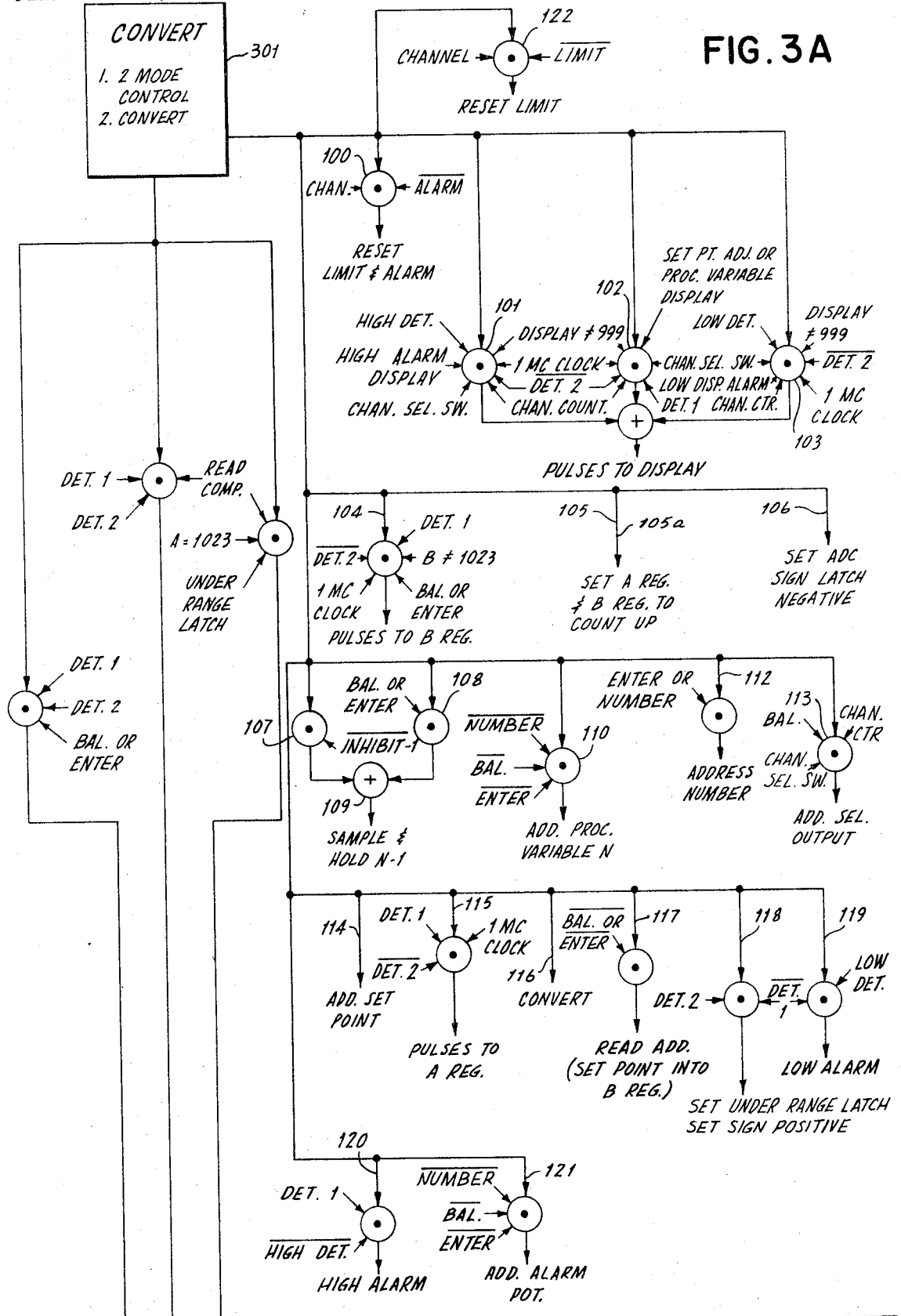

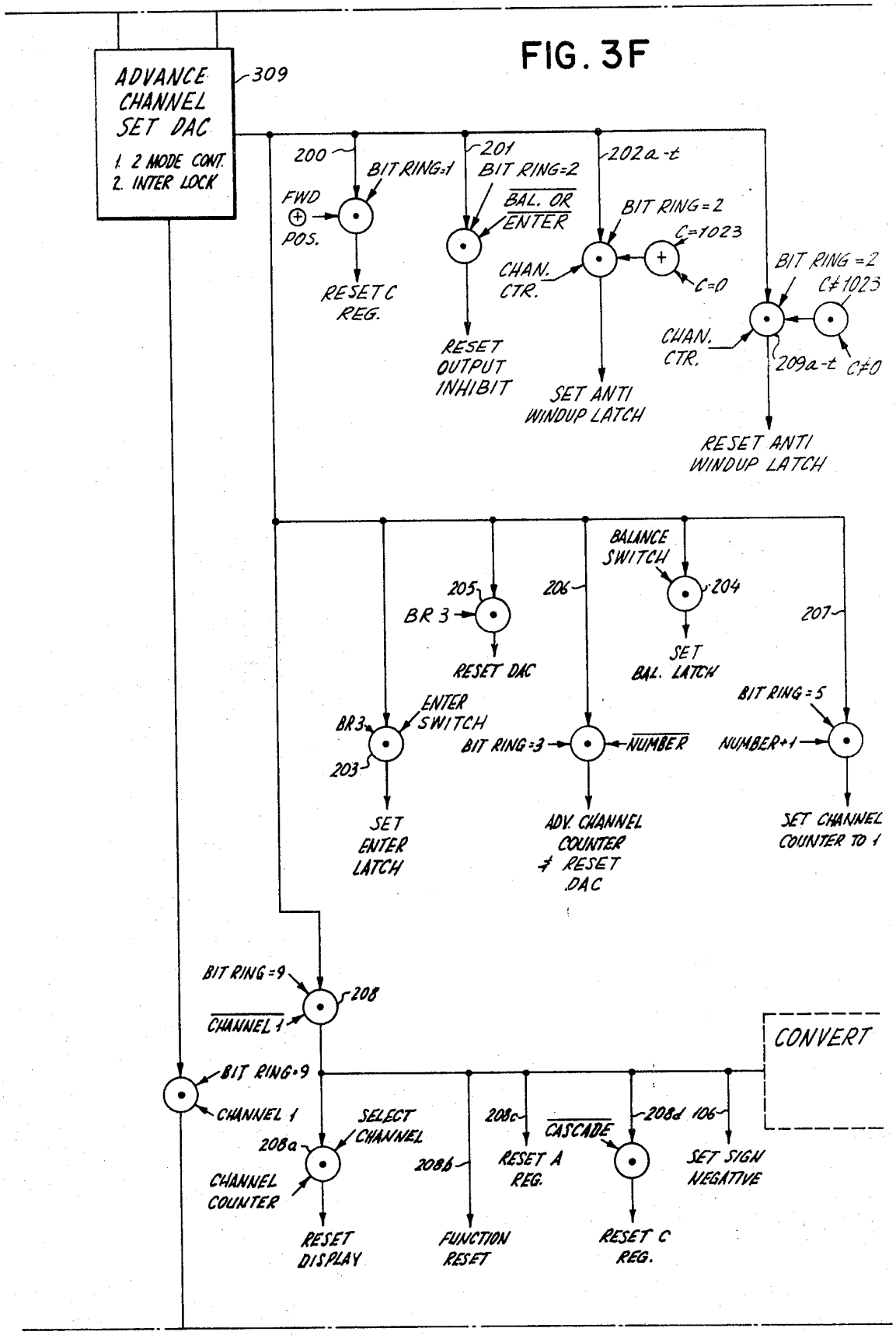

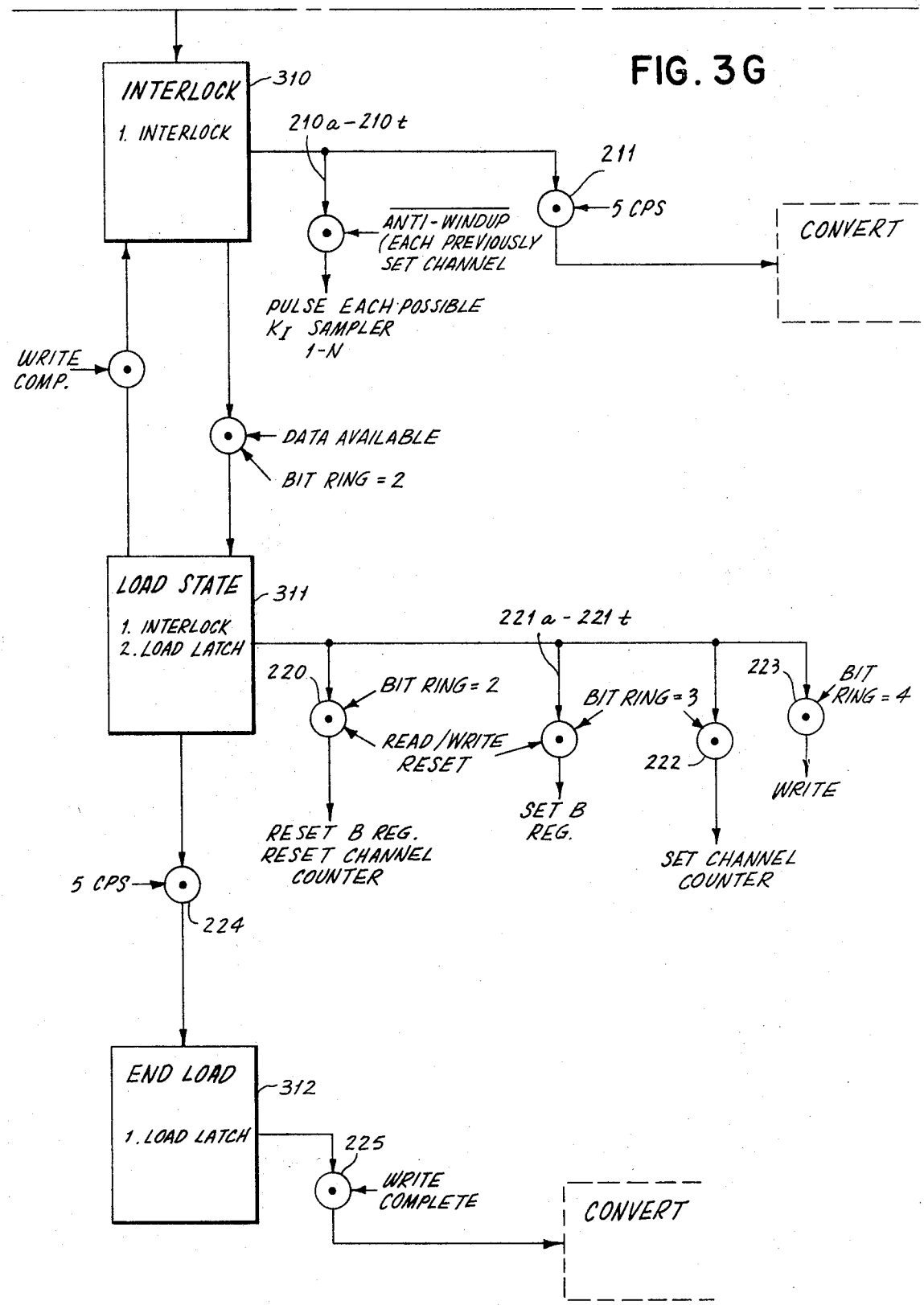

---

3,519,807
DIGITAL CONTROLLER WITH ALARM
James O. Jacques, Boulder, Colo., and Richard K. Oswald, San Jose, Calif., assignors to International Business Machines Corporation, Armonk, N.Y., a corporation of New York
Filed Jan. 17, 1966, Ser. No. 521,138
Int. Cl. G06f 15/06, 15/46
U.S. Cl. 235—151.1                    6 Claims

ABSTRACT OF THE DISCLOSURE

In a process control system, manual adjustment and automatic utilization of selectable set point limits is achieved through use of digital set point storage means in conjunction with adjustable analog devices for establishing limit and alarm values and an analog to digital converter. The system operates the counter to count at a fixed rate while the analog to digital converter generates a varying potential decreasing at a selected rate from a start point. The time relation between the complete countdown of the counter and the detection of amplitude coincidence between the varying potential and the values established by the analog devices determines whether the set point is outside limit or alarm conditions. When the set point represented by the stored value is outside the selected limits the system operates to provide an adjusted set point, which is also manually adjustable.

---

This invention relates generally to automatic control systems and particularly to systems which detect the existence of abnormal conditions and impose limits on the control action.

Feedback digital control systems desirably include some means for notifying an operator that the variable being controlled has passed an alarm limit. As an additional safeguard, some means of limiting the signal from the control system to the process is often provided to prevent operation in a range where danger exists or damage is likely to result. In multiloop control systems where some form of calculating means is multiplexed to each loop in turn, the test for abnormal variables is usually performed after the analog data has been converted into digital form. In such systems the alarm and limit values are contained in some form of storage system such as magnetic cores, a magnetic drum or magnetostrictive delay line.

Less sophisticated digital systems exist for the sole purpose of logging variables and alarm generating. While these systems invariably include an analog to digital converter, the test against limits is performed by comparators independent of the analog to digital conversion apparatus.

It is therefore an object of our invention to provide an improved control system.

It is another object of our invention to provide an improved system for checking variables against limits.

It is still another object of our invention to provide an improved system for limiting output signals from the control system.

In accordance with the invention, simple analog settings can be utilized for each channel in a digital process controlled to establish both alarm and limiting set point values. In the process control system, digital values representative of the set point are to be compared against digital values representative of the process variable. For entry of the process variable, an analog to digital converter utilizing a linearly descending ramp generator and a number of amplitude comparators or detectors are utilized.

Each of four comparators has a first input energized by the ramp signal. The comparator fires when the ramp voltage at the first input is equal to the voltage applied to a second input. A first of the detectors has the process variable applied to the second input. The output from the first detector indicates equality between the ramp and the process variable signal. A second detector has a reference voltage, representing the end of the ramp, connected to the second input. The output of the second detector indicates that the end of the ramp has been reached. The second inputs to the high and the low detectors are connected to high and low limit or alarm reference signals established by potentiometers.

When the amplitude of the process variable signal coincides with that of the ramp and the first detector fires, a counting sequence is initiated. The sequence terminates at the time when the ramp equals the signal at the second input of the second detector. The count thus generated is therefore a digital representation of the amplitude of the process variable signal. In the case where the first detector does not fire during the interval between the high and low detectors, an appropriate alarm indication is generated.

The same basic components utilized for testing high and low limit values, automatically cause the use of an appropriate set point limit if the set point falls outside the limits. In the system, registers containing the set point value and the process variable value are counted down at the same rate until a first one of the registers reaches zero, at which time the error signal is contained in the other register. For adjustment of the set points, however, the high limit detector is coupled to a potentiometer circuit that sets a high limit, which may be referred to as a starting limit. The low limit detector is coupled to a potentiometer circuit to set a low limit, which is more appropriately referred to as a span limit. After the ramp generator is started, the countdown of the summing counter is begun at the high limit condition, and the set point should be counted down to zero at a time between the time of firing of the span limit detector and the second detector. If it is not, the countdown is automatically shortened or extended to hold the set point. For example, if the set point value is counted down to zero prior to the span limit being reached, it is continued until the span limit is reached, thus establishing that the set point was too low and automatically increasing it to the minimum value. Conversely, if the set point was too high, the counting sequence is terminated by the second detector when the digital count reaches the maximum value.

The foregoing and other objects, features and advantages of the invention will be apparent from the following, more particular, description of a preferred embodiment of the invention as illustrated in the accompanying drawings.

FIGS. 3A to 3G, is a separate representation of the gating control and gate circuits utilized in the arrangements of FIG. 2.

In the use of FIG. 2, the separate sheets designated A through E respectively, should be aligned from left to right.

In the use of FIG. 3, the separate sheets designated A through G respectively, should be aligned from top to bottom.

Figure 1:
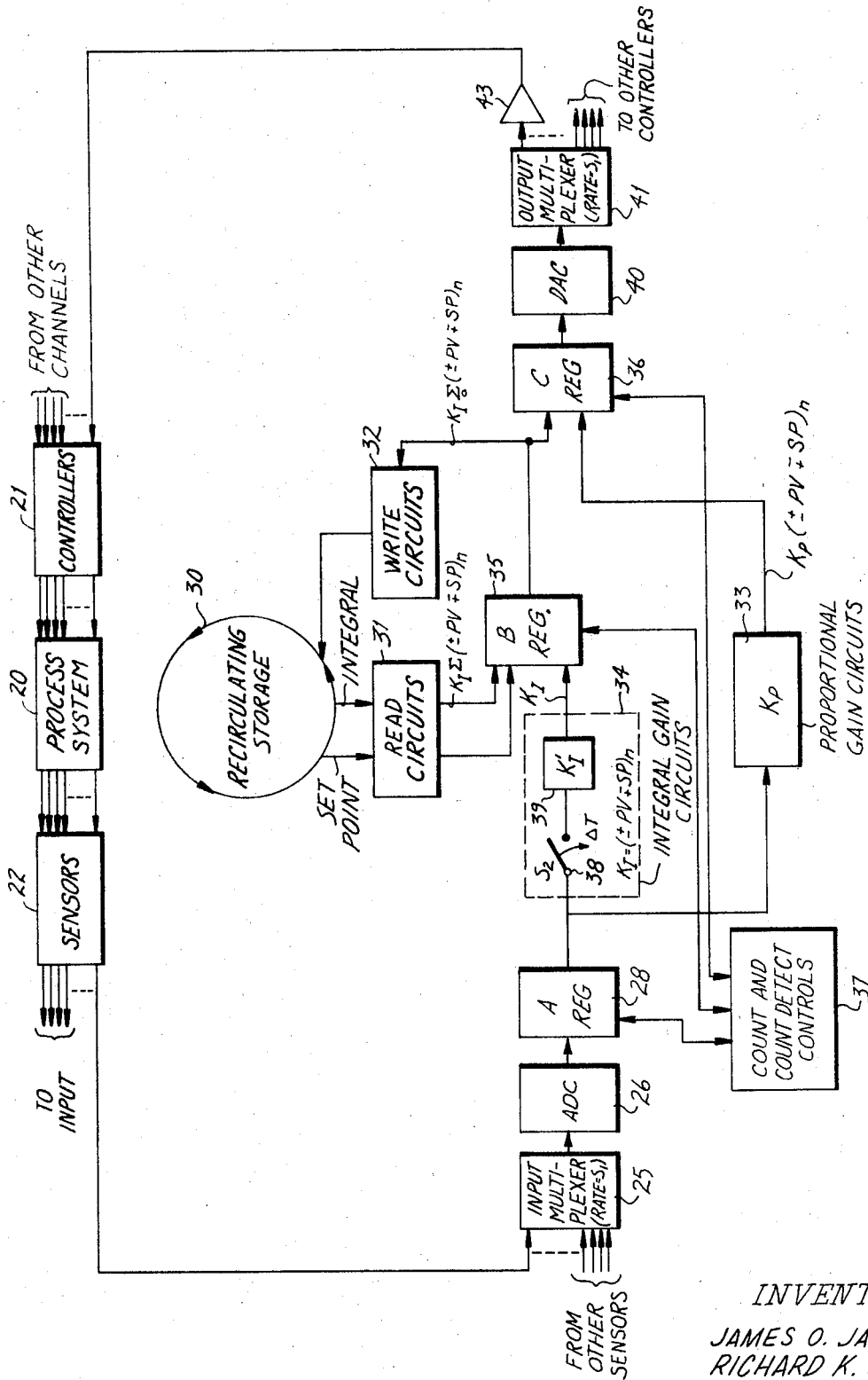
FIG. 1 is a generalized block diagram representation of the principal elements of a digital process system incorporating features in accordance with the invention.

The diagram of FIG. 1 shows in generalized form a digital process control system for concurrently adjusting and maintaining a number of individual operative set points, representing different system variables, within a process system 20. For the present example, it will be assumed that twenty different variables are controlled, and that a corresponding number of controllers 21 are operated by the process control system in response to directly or indirectly related values derived from sensors 22. The control system may be referred to therefore as a multifunction or multiloop controller, and operates continuously in highly integrated fashion. The controllers 21 and sensors 22 may be conventional analog devices and need not be further described in detail. The set points are chosen or adjusted, as described in detail hereafter, in accordance with known considerations determined with respect to the process system 20, and may be affected by external automatic control or by operator control during operation.

Signals derived in the multiple parallel channels from the sensors 22 represent the process variables (hereafter PV) and are applied to an input multiplexer 25 that may be generalized as a first switch $S_1$ operated at a first known rate. Signals from the input multiplexer 25 are applied in the single output channel to an analog to digital converter 26 of the type that effectively converts the amplitude of the applied input signal to a signal defining a variable time duration. This time duration is used in controlling the application of clock pulses to a first summing counter, termed the A register 28. The time interval during which the pulses provided from a standard clock source are applied to the A register 28 determines, of course, the number of pulses applied, so that the PV value is represented in digital form.

The multi-function controller system performs a two term control computation in adjusting in process variable relative to a stored set point. The set point is derived from a recirculating storage 30, typically a delay line system although a drum, disc or other recirculating memory may be used. Read and write circuits 31, 32 respectively provide for access from and entry to the storage 30. For ease of understanding only, the read circuits 31 are shown as separating the set point and integral values in playback, although this separation is accomplished by conventional gating circuits. The set piont (also termed SP herein) is entered as a digital count in the B register 35, with the A register 28 receiving the PV value. Subsequently, a series of pulses is applied to drive the A register 28 and the B register 35 to zero, so that one value is effectively subtracted from the other. The result, taking into account certain limit adjustments described below, constitutes the error quantity and is presented by the A register 28 as a digital count.

The error represents the subtraction of one quantity from the other in a sense dependent upon whether forward or reverse control is used and upon the particular limit relationships. Forward or reverse control is used depending upon the sense in which adjustment of a given controller causes a variation of the associated process variable. A pulse series and an equivalent pulse duration representative of the amplitude of the error are provided for further processing by counting down the A register 28 at the clock rate.

A single term control computation would adjust the error by a given proportional, integral, or other factor in deriving a control signal suitable for application to the associated controller. The present system provides a two term control computation in which, for each channel, an analog proportionality term $K_P$ and an integral $K_I$ are each applied to the error signal in deriving the control signal. For this purpose, proportional gain circuits 33 convert the pulse series derived from the A register 28 into a lesser number of pulses in a ratio depending upon the proportionality factor, and apply the adjusted count to a third summing counter or C register 36 which also receives the updated integral term in digital form from the second summing counter or B register 35. The summation of these two terms, provided as the output signal from the C register 36, is the output control or corrective signal for the specific channel. The integral term is updated by combining the summation of the previous integral term derived from the read circuits 31 with the current error level, as adjusted by the integral gain constant in the integral gain circuits 34.

The three summing counter units 28, 35 and 36 are counted down or up, for determinable intervals, under the command of circuits here designated the count and count detect controls 37. The circuits 37, as described in detail below, operate at chosen clock rates to drive the various summing counters simultaneously in the same or different senses until selected states are reached. Thus, if two counters containing different counts are downcounted synchronously, the count remaining in one after the other has reached zero is the difference quantity. Similarly, the count stored in one may be transferred, with or without modification, into another by counting synchronously in opposite senses.

A suitably small fractional integral term may be multiplied against the incoming error signal by utilizing both a variably timed switch 38, operated in synchronism with the input and output multiplexers, and a variable pulse divider circuit 39, here designated $K_1'$. Thus, from the integral term for the particular channel derived from the read circuits 31, and from the integral component representative of the current error signal derived from the integral gain circuits 34, the count applied to the C register 36 represents the updated integral which is also replaced in storage.

The digital output signal provided from the C register 36 is applied through a digital to analog converter 40, the output multiplexer 41, and a suitable holding amplifier circuit 43, so that an output control signal of duration sufficient to cause adjustment of the associated controller is provided during the interval in which the output multiplexer 41 addresses the particular channel.

It will be appreciated that the system thus far broadly described has a number of advantages as a process controller. It is extremely flexible in operation because of its organization and because of its digital nature. Set points and gain constants may be varied in operation either by the operator or by an external data processing system, if desired, because indirect or direct access may be had to the registers. The manipulation of values in digital form further permits the system to be operated generally in conjunction with a central data processing system when desired. The two term control computation improves both the stability and accuracy of this system over a single term control computation. Major excursions in the error signal are corrected principally by the presence of the proportional term although some contribution is also derived from the integral term. Drift and other long term, small magnitude, errors that would not ordinarily be corrected by the proportional term are corrected by the integral term. The integral term is digitally stored, and therefore may be retained indefinitely without being subject to or introducing error.

This broad description of the system encompasses a substantial number of specific features described in detail hereafter. The drawings comprise a detailed block diagram (FIG. 2) of the system, showing the organization of the various input and output systems as well as control and indicator devices, including multiposition switches, individual control switches, adjustment devices and indicators. The complete system as represented in FIG. 2, comprises separate sheets denoted FIGS. 2A to 2E. While all the principal components are described in detail hereafter, a detailed description of the logical gating circuits would be repetitious for those skilled in the art inasmuch as each of the terms applied in the form of signals to each gate is represented in the figures. It is considered more convenient and clear to present the various modes and gating sequences separately in FIG. 3, comprising sheets FIGS. 3A to 3G, inclusive, to provide the functioning of the logical gating circuits in a more readily visualized format.

In FIG. 3, the various principal modes of system operation are identified as a sequence of rectangles 301–312. The individual gates associated with each mode are disposed in laterally extending fashion to illustrate the manner in which the specific control signals are generated for each control function and change of state is utilized in operation in a particular mode. Along with the successive modes, states or levels of the system, FIG. 3 shows the individual signals provided from a group of latches that are down-counted to identify the modes. Only the latches in the "on" condition are shown in the block identifying the mode. Although not shown in FIG. 2 for simplicity, the latches control shift from one mode to the next in the following sequence:

CONVERT (301—FIG. 3A)
READY 1 (302—FIG. 3B)
COMPUTE ERROR (303—FIG. 3B)
ADDRESS DELAY LINE (304—FIG. 3C)
READY 2 (305—FIG. 3C)
TWO TERM COMPUTE (306—FIG. 3D)
WRITE STORAGE (307—FIG. 3E)
TRANSFER INTEGRAL TO C REG. (308—FIG. 3E)
ADVANCE CHANNEL—SET DAC (309—FIG. 3F)
INTERLOCK (310—FIG. 3G)
LOAD STATE (311—FIG. 3G)
END LOAD (312—FIG. 3G)

It will be noted that the modes are distinguished by a change of state of the latches. At each mode, a number of gates are conditioned to provide outputs used for further gating or advance. These gates are either "AND" gates, designated by the multiplication symbol (·) or "OR" gates, designated by the addition symbol (+), in conventional fashion. Where gates are repeated for convenience of reference in different parts of FIG. 3, they bear the same numeral designation. When so shown, however, they are conditioned by different mode signals.

Shifts between the mode rectangles 301–312 in FIG. 3 are undertaken upon the passage of gate signals through gates serially connecting the rectangles and corresponding to the latch controls. Certain of the advances are governed by signals from a Bit Ring Circuit (generating signals designated BR1 through BR11 respectively) associated with the recirculating memory and described in detail below. The Bit Ring Circuit not only governs the timing of data into and out of the recirculating storage, but provides a time sequence by which other gating functions may be performed.

It should be appreciated that for each channel separate circuits are used for set point adjustment, alarm indications and gain selection.

Figure 2A:
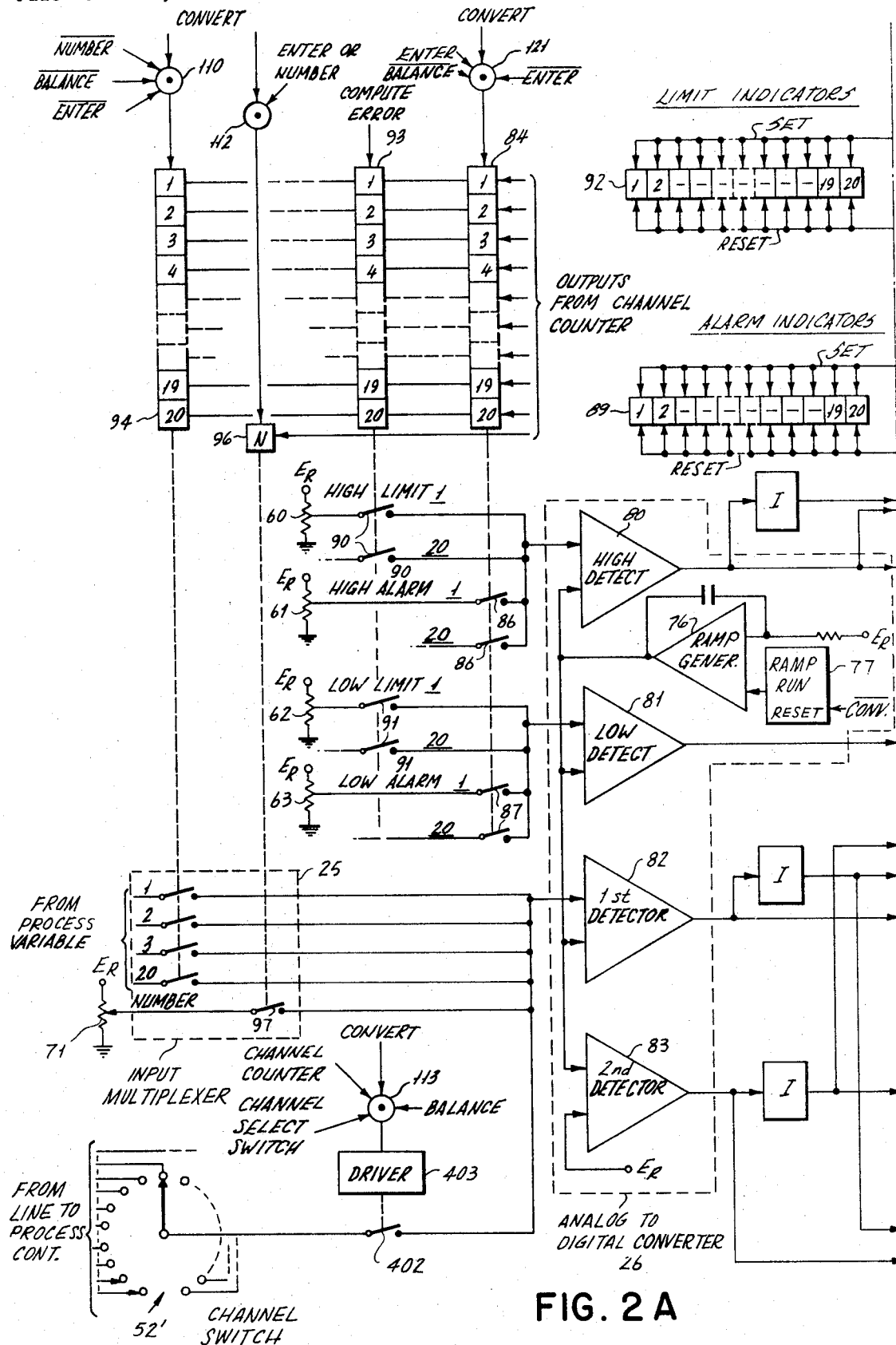
FIG. 2 is a schematic and detailed block diagram, comprising sheets designated FIGS. 2A to 2E respectively, of a digital process controller in accordance with the invention, showing details thereof, and FIG. 3, comprising separate sheets designated
Figure 2B:
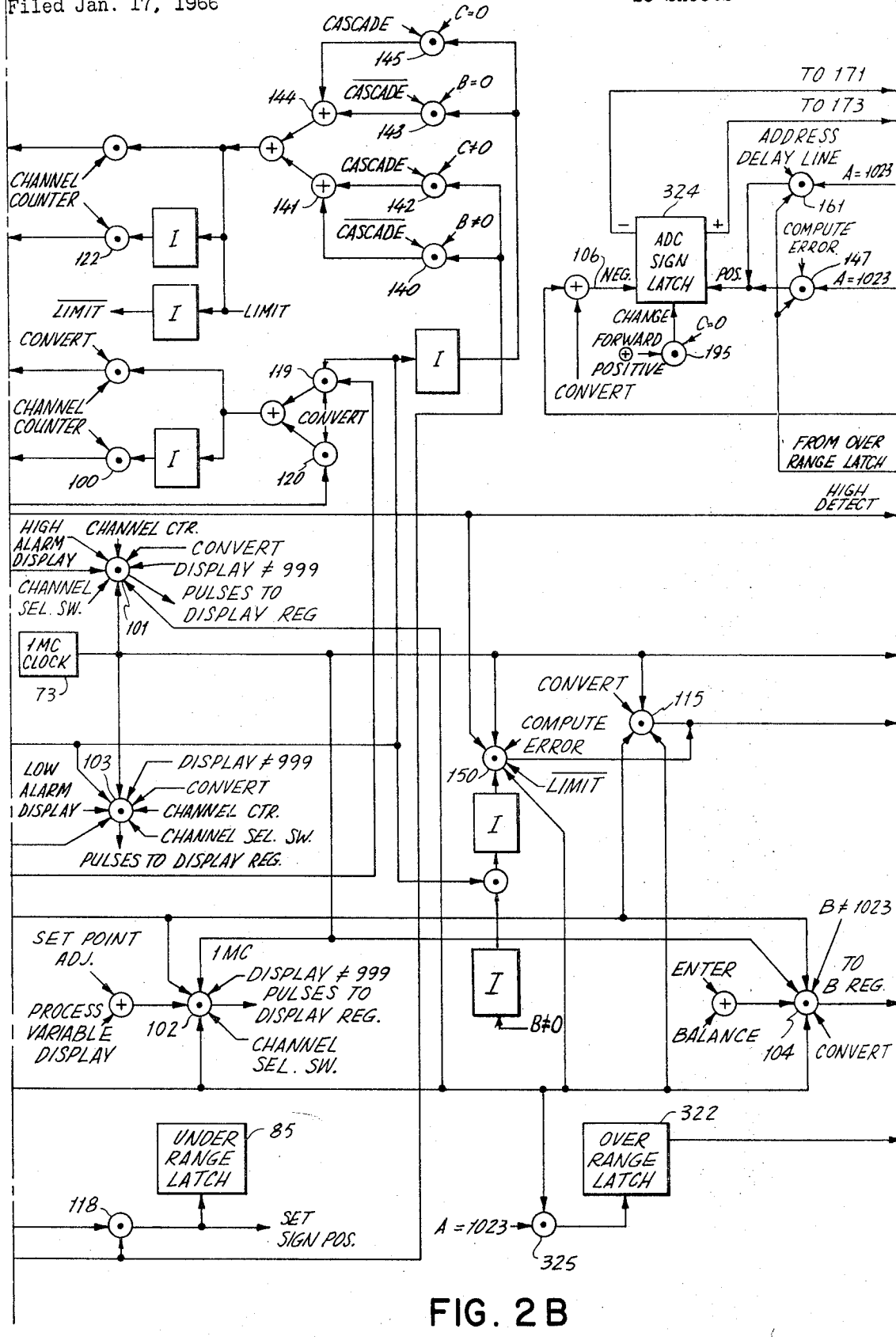
Figure 2C:
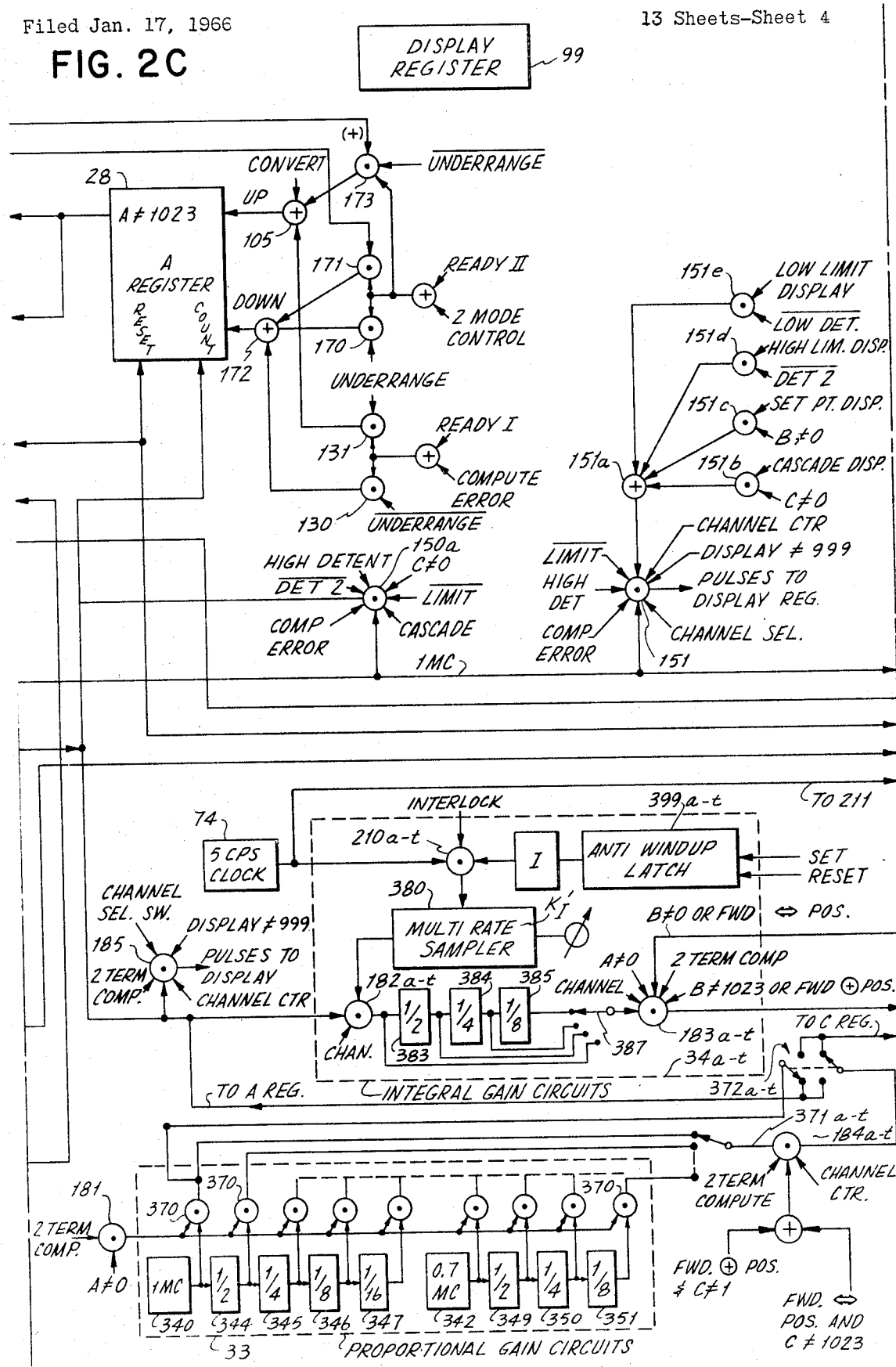
Figure 2D:
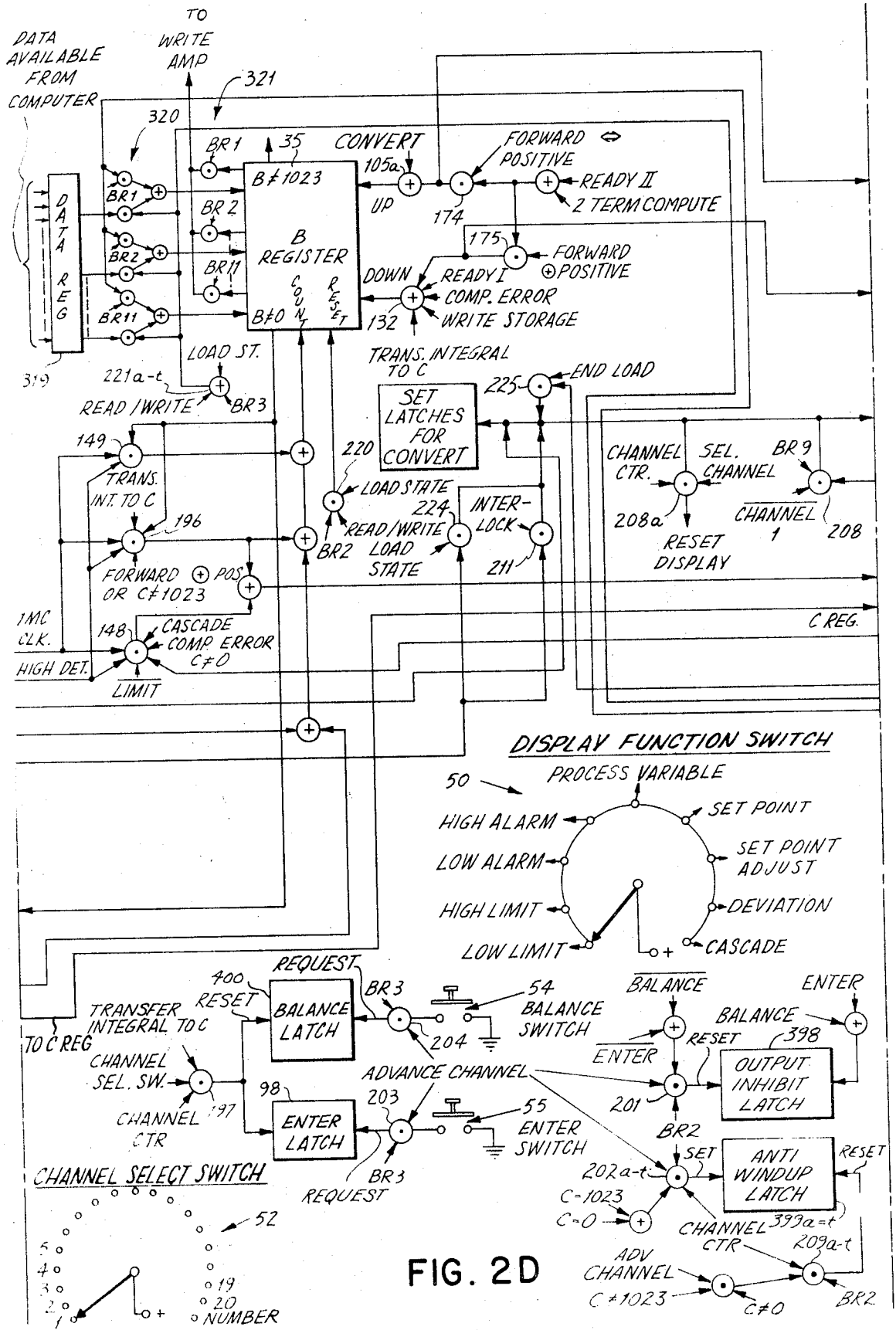

Referring now to FIG. 2, comprising the separate sheets designated FIGS. 2A to 2E inclusive, reference is made to the separate units that are subject to operator adjustment or control, as well as those units previously broadly referred to in the description of FIG. 1. The operator has at his command a display function switch 50 and a channel select switch 52, by which a given channel may be chosen for adjustment of set point, limit or alarm conditions, for testing purposes or for the performance of other functions. Both the display function switch 50 and the channel select switch 52 are shown in FIG. 2D. A separate ganged armature and contact set 52' (FIG. 2A) is provided with the channel select switch 52 for use in a "Balance" operation. In FIG. 2D are also shown a balance switch 54 and an enter switch 55, both of the single action type. The latter switch 55 is more fully described as an "enter set point" switch.

At the input end of the system (FIG. 2A), the operator is able to adjust, for each channel, each of a set of four potentiometers 60, 61, 62 and 63, these being the high limit, high alarm, low limit and low alarm potentiometers respectively. Each channel also provides a switch 67 (FIG. 2E) for selecting forward or reverse control, and in this conjunction it should be noted that the terms "Forward ↔ Positive" and "Forward ⊕ Positive" are the inverse of each other. At the output end of the system, the operator can also adjust individual potentiometers 65 for each channel, after engaging an automatic-manual selector switch 66 appropriately to provide manual control for selection of the setting of the associated control unit. Additionally, there is for each channel a switch designated as the cascade switch 68, used in the performance of a selectable data interchange function described in greater detail below.

Figure 2E:
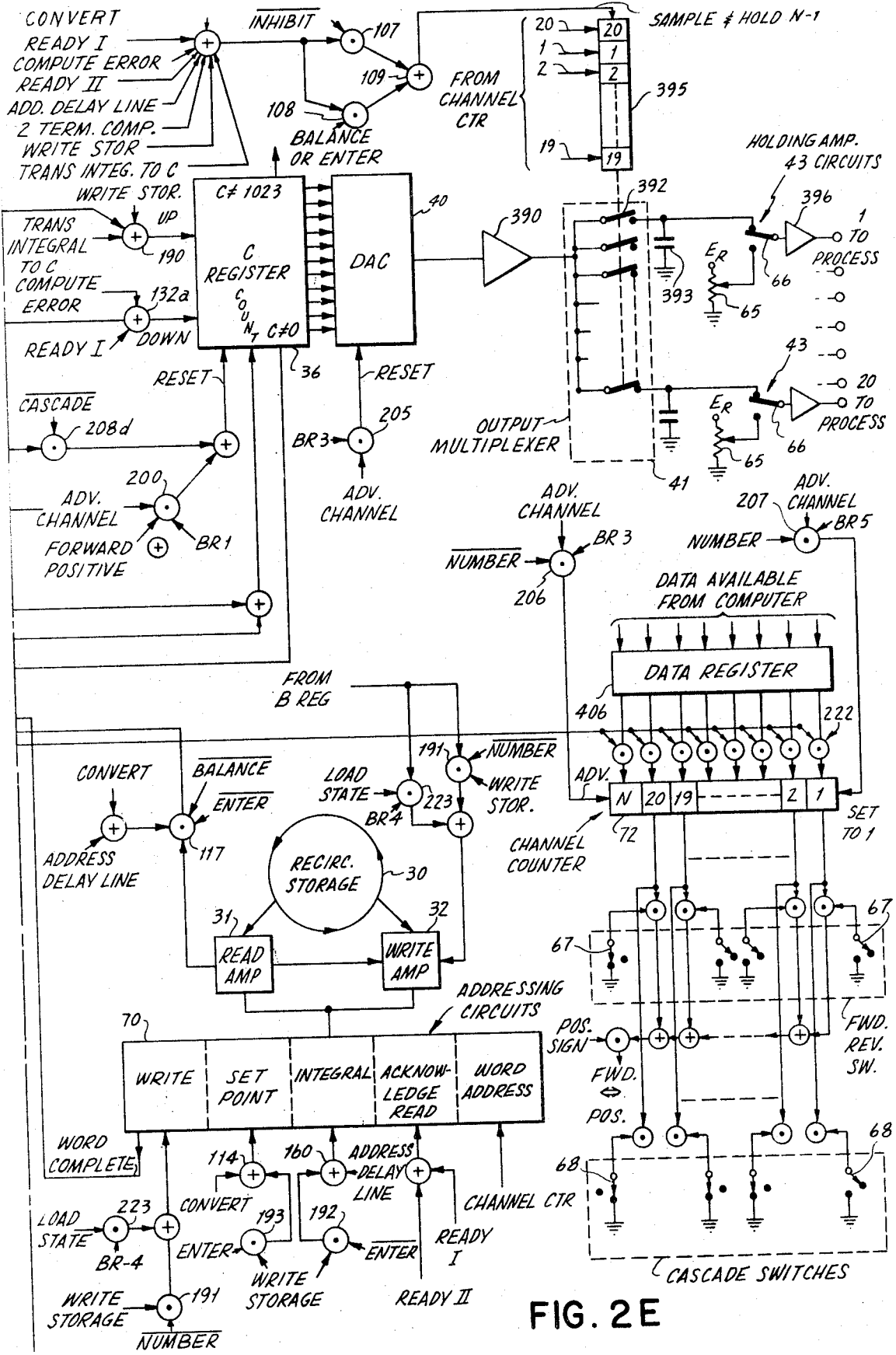

The recirculating storage 30, together with the read amplifier and write amplifier circuits 31, 32 respectively are shown only in general form in FIG. 2E. The addressing circuits 70 for control of entry and extraction of data from the recirculating storage 30 are also shown only generally, inasmuch as these addressing circuits may be conventional. The set point and integral values for each channel are stored at separate locations in the storage, and a channel counter 72 controls sequencing of the multiplexers and other synchronously operated units by determining the channel at which the set point and integral values are reproduced and entered during operation. The channels counter 72 is used in conjunction with many other gating and selection functions as well. The channel counter 72 may be a conventional step counter having one extra position ($n$) in addition to the twenty positions chosen for the present example. It may comprise an interconnected chain of bistable elements or a binary counter together with an output matrix, but has not been shown in detail for simplicity. The 21st position, designated $n$, is a dummy or "number" position used for entry of a manually adjusted set point through a potentiometer 71 (FIG. 2A).

The system also employs two basic clock signals, a 1 mc. clock 73 (FIG. 2B) being utilized in sequencing through various states and in the generation of the serial pulse trains representative of digital counts, and a 5 c.p.s. clock 74 (FIG. 2C) being utilized to control scanning of the individual channels at five times per second. These rates may be adjusted as desired, although they are representative of suitable clocking rates for data transfer and loop scanning in a typical digital process control system.

The following detailed description of various operative sequences include the entry of the PV signal, the two term computation and the generation of the output control signal. While they may encompass all the modes 301–312 illustrated in FIG. 3, they are not arranged in chronological order but with respect to separate functions. Concurrently there are described various features by which great flexibility and operative convenience are imparted to the system without a commensurate increase in equipment or cost. It will be understood that the description is concerned primarily only with a single channel, and that similar operations take place for each other channel, in sequence.

ENTRY OF DATA

The following description is concerned primarily with the derivation and conversion of the signals utilized for the subsequent two term control computation. Although reference is made to various parts of FIG. 2, primary reference is to FIG. 2A, and to FIGS. 3A and 3B. Among the features included in this portion of the system are an arrangement by which the analog input signal is checked for alarm violations, another feature by which the operator is prevented from utilizing a set point outside the preset limit values, and also a feature by which new set points may be simply but readily selected and then entered into the system.

The analog to digital converter 26 in FIG. 2A principally uses a ramp generator 76 that may be triggered to initiate a linearly descending wave form under control of a circuit here shown separately as a ramp run circuit 77. The 5 c.p.s. clock signal initiates scanning of the succession of channels, or the channel counter 72 shifts from one channel to the next, starting a transitory start-convert mode (not shown in FIG. 3) that removes a reset bias from the ramp run circuit 77. This event initiates the "convert" mode illustrated in FIG. 3A. With the input multiplexer 25 coupling an appropriate channel to the analog to digital converter 26, and the process variable being provided as an analog signal on the input line, the ramp generator 76 initiates the linearly decreasing ramp wave form. The ramp signal is coupled to activate one input of each of a succession of four detection circuits labeled successively the high detect circuit 80, the low detect circuit 81, the first detector 82 and the second detector 83. In the absence of limit or alarm conditions, the first and second detectors 82, 83 control the analog to digital conversion. In the start-convert mode, the ramp generator 76 continues to operate as it passes down through the level of the PV signal provided from the multiplexer 25. The first detector 82, however, fires whenever the ADC ramp is equal to the selected input signal amplitude, activating the gate 115 (FIG. 2B) and applying pulses from the 1 mc. clock 73 to the "count" input of the A register 28 (FIG. 2C). The counting operation and subsequent operations are described below with respect to the computation function, and it suffices here to say that the counting sequence continues until the second detector 83 is actuated at a selected reference level, here designated $E_r$. In the present instance, a voltage level of one volt is selected for the minimum, or reference, and the ramp generator 76 is arranged in conventional fashion to provide a ramp signal in the range from approximately 6 volts downward. The set points are for convenience set in the range from 0 to 999 and are computed and displayed in this form.

Firing of the second detector 83 terminates the "convert" mode and initiates a subsequent mode which may be designated as "ready 1" (FIG. 3B), in which the summing counters 28, 35, 36 are set to count in appropriate directions. A significant number of features are provided in conjunction with this basic analog to digital conversion circuitry. First it may be noted that the PV signal may be less than one volt in amplitude, so that the second detector 83 may fire before the first detector 82. If this occurs, during the convert mode "under range" gate 118 (FIG. 2B and FIG. 3A) is activated, actuating an under range latch 85 that reverses the sense of counting in the A register 28 (FIG. 2C) through a sequence of gates 170, 172 (also shown in FIG. 3C). Note that in the convert mode 301 (FIG. 3A), the "2 mode control" latch also is on, to fully condition the gate 170. The A register 28 is normally set to count up when entering the PV digital value and this reversal of the sign enables an appropriate value to be entered.

A further important feature of this arrangement is the fact that it permits the alarm settings to be determined by the potentiometers 61, 63 for the particular channel. In the "convert" mode, a set of gates 84 (FIG. 2A) coupled to the channel counter 72 (FIG. 2E) complete circuits to the high alarm switches 86 and low alarm switches 87 (FIG. 2A) for the particular channel, so that these are coupled to the high and low detectors 80, 81 respectively. The ramp signal from the generator 76 is concurrently applied to the high and low detectors 80, 81. A time comparison is also made in a pair of associated gates 119, 120 (FIGS. 2B and 3A) as to the relative times in which the high, low and first detectors, 80–82 respectively, fire. If the first detector 82 fires prior to firing of the high detect circuit 80, the gate 120 activates the appropriate channel of alarm indicators 89 through input control gates 100, 119, 120 (FIG. 2B) scanned by the channel counter 72 (FIG. 2E). If the low detect circuit 81 fires prior to the first detector 82, the output of which is taken through an inverter circuit, a second AND gate 119 coupling into the alarm indicator gating circuits is activated for that particular channel, as shown in FIGS. 2B and 3A. It will be appreciated that these tests and indications are provided concurrently with basic analog to digital conversion, so that no extra time is required for the alarm check. Furthermore, only relatively simple alarm circuitry is associated with each individual channel, eliminating the need for a central storage facility as well as the need for separate comparison functions and equipment.

It will also be noted that high limit 90 and low limit 91 switches are provided for each channel, these being controlled by separate channel selection gates 93 activated during the "compute error" mode (which may also be referred to as "error compute") and individually selected in accordance with the state of the channel counter 72. While the "compute error" mode will be described below in conjunction with the two term integration, that aspect concerned with the automatic utilization of high and low set point limits in the system exists during "ready 1" and is directly pertinent to the input control function. To appreciate the operation of these units, further brief discussion of the functioning of the B register 35 (FIG. 2D) is in order. The process variable is entered into the A register 28 as previously described, with the set point being entered into the B register 35 from the storage 30 (FIG. 1). This is accomplished previous to the error compute mode, so that the two registers 28 and 35 may be counted down simultaneously with the number of pulses remaining in one after the other has reached zero representing the desired error value. Under certain conditions of operation, however, as in start-up or other transient states, the set point in the storage may not be useful as such. Also, because of operator error or other causes, an erroneous set point outside of limits predetermined for the system may be entered. The settings of the limit resistors 60, 62 are used to control the range of set points that may actually be utilized.

It should particularly be noted, however, that the low limit potentiometer 62 is not truly a low set point element. It is more appropriately referred to as a span limit potentiometer, because it does not constitute an absolute low limit but serves as a reference from which an acceptable range is defined. This span limit function permits simplification of the circuitry, and is described in detail hereafter.

In the error compute mode, the ramp generator 76 is again initiated after closure of the input switches 90, 91 controlled by the gates 93 in correspondence to the particular channel then in use. In the error compute mode, the A register 26 is counted down by the clock pulses from the source 73 as shown by gate 150 in FIG. 3B and FIG. 2B. Initiation of the ramp pulse from the generator 76 causes the high detector 80 to fire first, coupling the 1 mc. clock to the A register. At the same time, 1 mc. clock signals are coupled to the count input of the B register 35, through a gate 149 (FIG. 2D) that is fully activated because of the presence of the $B \neq 0$ and the high detect signal. Thus the countdown of both registers 28, 35 takes place simultaneously, with the pulses generated during this interval representing the set point accumulation. In this mode, the first detector 82 is not utilized, but the outputs from the low detector 81 and the second detector 83 (FIG. 2A) alone determine the total number of serial set point pulses actually used. Normally, when the set point is in the desired span, the B register will count down to zero somewhere between the time of the firing of the low detector 81 and the second detector 83. If this occurs, the low detector 81 fires first. Then when the $B \neq 0$ signal terminates, the $B \neq 0$ signal input goes "false," and the output taken from the inverter goes "true," representing $B = 0$. This term, plus the low detect signal activate an "and" gate whose output is inverted to disable the gate 150, terminating the application of pulses to the A register 28. Concurrently, the gate 149 is disabled because of the termination of the $B \neq 0$ signal. The count remaining in the A register 28 therefore represents the error quantity.

If, however, the B register 35 counts down to zero before the low detector 81 or after the second detector 83, it is outside the desired limits. Thus, the span in which the set point must fall (given a start point established by the high detector 80) is actually determined at a minimum value of pulses established by the low detector 81, and the maximum value of pulses is then established by the second detector 83. This span voltage therefore defines the true set point limits.

In the event that the B register 35 counts to zero prior to the firing of the low detector 81, counting pulses continue to be forced through the gate 150 for application to the A register 28 until the low detector 81 fires. In effect, the set point is established at its lowest limit because the error will be largest at this point in the span. When the second detector 83 fires, the gate 150 is disabled, regardless of whether or not the B register is at zero. This insures that the countdown of the A register 28 is terminated upon firing of the second detector 83 in any event.

To summarize, therefore, the span range is determined by the low detector 81, which detects the lower limit on the ramp, and also the lower limit on the set point, because if the chosen set point would give a greater error, the B register 35 counts down to zero before the detector fires, and the detector therefore decreases the error by this amount. On the other hand, if the stored set point is excessive, the second detector fires to generate the upper limit of the set point and to provide the minimum error signal. The maximum acceptable value for the set point is set by the high limit potentiometers 60 which in effect starts the count. The span of the set point limits, as well as the actual minimum and maximum set point values, is then determined by the setting of the low limit potentiometer 62. For this reason, the number of counts between the high limit and the low limit, as well as the range, are varied by adjusting only the low limit potentiometer.

Important advantages are derived from this arrangement, inasmuch as it enables realistic set points to be used and also enables the system to be operated under operator control during transient states. During startup, for example, the set point may be set outside the limiting range, typically at a maximum value. In this instance, the set point that is actually used is determined by the setting of the high limit potentiometer which starts the set point count, because the count continues until the second detector 83 is fired. When the appropriate stable set point is reached as the process system moves toward a steady state condition, the value of the setting of the high limit potentiometer 60 can be read in the display, in a manner described below, and then entered as a new set point. Another advantage of this arrangement is that it provides an automatic fail-safe feature, in that the limits are continuously tested during normal operation. In the event that a stored set point is lost or some error occurs, the limiting values automatically control.

SET POINT ENTRY

The manner in which the set point for an individual channel may be varied by an operator will be principally described with respect to FIG. 2, and principally involves the channel counter 72 (FIG. 2E) the channel select switch 52 and display function switch 50 (FIG. 2D) and the set point enter potentiometer 71 (FIG. 2A).

It was previously stated that the channel counter 72 contains an extra digital place, constituting a dummy position designated as the "number" or "$n$" position. in this 21st position, the channel counter 72 generates a "number" signal to condition a gate 112 (FIG. 2A and FIG. 3A) energizing a gate 96 that controls a 21st position switch 97 in the multiplexer 25, closing the switch to couple the set point enter potentiometer 71 to the first detector 82. This enables a signal at a level determined by the setting of the potentiometer 71 to be entered into the analog to digital converter 26. Concurrently for this operation, the display function switch 50 (FIG. 2D) is set to the set point enter position, and the enter set point switch 55 is closed, actuating the enter latch 98 through a gate 203 (FIG. 2D and FIG. 3F). The system includes, as generally shown in FIG. 2C, a display register 99, including a resettable counter (not shown) for accumulating a series of pulses representative of a binary value, and appropriately converting to decimal values for convenience. In FIGS. 2B and 3A, it is seen that the gate 102 is activated during the number state because of the settings of the display function switch 50, and the channel select switch 52, with the display having been reset prior to this time. At the dummy or number position of the channel counter 72, therefore, the 1 mc. clock pulses are applied to the gate 102 for a duration determined by the interval between the firing of the first detector 82 and the second detector 83 in the analog to digital converter 26. The pulses are totalled in the display register 99, and the totals are displayed for the operator. This action occurs each time the number state is reached at the end of a scan of the various channels, or five times per second. From the standpoint of the operator, the displayed count changes concurrently with his adjustment of the entry potentiometer 71, so that he can directly observe in digital form the setting he is making for a particular selected channel.

Once the chosen setting has been reached, the set point is required to be entered into the appropriate channel and into the recirculating storage at the appropriate point. For this purpose, the enter latch 98 is now actuated by closing of the enter set point switch 55, as previously described, with the channel select switch 52 being at the desired channel position. This is accomplished during the next scan of the given position, by entry of the chosen set point from the potentiometer 71 (FIG. 2A) into the B register 35 through the gate 104 (FIG. 2B and FIG. 3A). The gate 104 is opened to pass 1 mc. clock pulses for an interval initiated by the firing of the first detector 82 in the ADC 26, the interval being terminated by the firing of the second detector 83. The applied pulse series is accumulated in the B register 35, and thereafter transferred into the recirculating storage 30 system, during succeeding modes that are discussed in detail below.

It will be noted that apart from the set point entry potentiometer 71 and a relatively few gates and switches, this system utilizes existing units of the process control system in an inter-related fashion. The problem of entry of a selected digital value is thereby solved at minimum expense, but with full operator convenience. These features are made possible through the use of the dummy position in the machine cycle, and the relationship of the analog, manually controllable, input to the analog to digital converter and the display and B registers. A direct technique for the entry of a digital value is provided that is far less expensive than other available expedients conventionally used. The potentiometer adjustment and comparison to a concurrent digital display are particularly easy for an operator to utilize and understand. Furthermore, separate mechanisms are not required for each individual line, and no special addressing or other circuits are required.

It is convenient to note here that normal operation of the system maintains the output signal for the previous ($n-1$) channel through the "convert" to transfer integral to C" modes (FIG. 2E), and then switches to the newly generated signal in the "advance channel" mode. When using "balance" or "enter" for a given channel, however, the output inhibit latch 398 (FIG. 2D) is set, blocking the sample and hold output signal. This latch is not reset on the first "advance channel" signal, but on the one thereafter, balance or enter switch 54 or 55 for the channel turns its associated latch "on" at the first advance channel signal. Thus output signals are not provided on the selected channel as they normally would be.

TWO TERM COMPUTATION

The function of modifying the error signal for a particular channel in accordance with both integral and proportional terms, selectively adjusted as to gain, has been briefly referred to above. This portion of the system relates primarily to FIGS. 2C, 2D and 2E, and virtually all of FIG. 3. The following description pertains not only to the manner in which the three summing counters 28, 35 and 36 are utilized, but particularly to the manner in which the gain adjustment circuits (designated 33 and 34 in FIG. 1) operate. Note that separate integral gain circuits 34a-t inclusive are used for the different channels. Entry of representations into the display, and the manner of entry into and reading from the recirculating storage, will be referred to generally here, but are set out in more detail below.

Both the A register 28 (FIG. 2C) and the B register 35 (FIG. 2D) include ten binary bits for counting from 0 to 1023. The B register 35 is limited in this respect, and does not count over-range or under-range. The A register 28, however, includes additional bits for counting over-range and under-range. Both the registers operate as reversible summing counters, and have "up" and "down" inputs at which the directions of the counts may be reversed. Each register also includes an input to which the pulses to be counted are applied, and a reset input, as well as conventional means (described as part of the register for convenience only) for identifying predetermined counting states. In the A register 28, the predetermined states are $A=0$ and its inverse, and $A=1023$ and its inverse; in the B register 35 the predetermined states are $B=0$ and its inverse, and $B=1023$ and its inverse. The C register 36 corresponds to the A register 28, in that it has both under-range and over-range conditions, and may be counted negative prior to being counted in the opposite direction during the two term control computation.

On entering the convert mode, a gate 208 (FIG. 2D and FIG. 3F) is actuated as a function reset signal and applied to the reset input of the A register 28, with the B register 35 being reset through a gate 220 (FIG. 2D and FIG. 3G) thereafter. Then, during the convert mode as previously described, the value of the process variable is entered into and held in the A register 28. During convert also, the addressing circuits 70 for the recirculating storage 30 (FIG. 2E) select the set point to be read into the B register 35 through a gate 117 (FIG. 2E and FIG. 3A). This count comprises a serial binary number read into the appropriate parallel digital positions of the B register 35 through a group of gates 320 (FIG. 2D). Note that these gates 320 are also associated with a separate data register, 319 and may, alternatively be used for the external entry of a chosen set point into the B register 35. Separate gates 321 are used to read out the B register 35 contents. The C register 36 is concurrently reset through a gate 200 (FIG. 2E and FIG. 3F).

The sign of the quantity in the A register 28 is controlled by an over-range latch 322, and under-range latch 85 and an ADC sign latch 324 (FIG. 2B). The over-range latch is set by a gate 325 in the event that the count of A−1023 is reached prior to firing of the second detector, and latching of this circuit 322 conditions a gate 147 during the compute error mode to set ADC sign latch 324 positive. This in turn conditions a gate 171 that controls the gate 172 (FIGS. 2C and 3C) that set the A register 28 to count down. Various functions, insuring that proper arithmetic signs are used, are employed and these are described in more detail below. The generation of the error signal then takes place during the compute error mode.

Figure 3B:
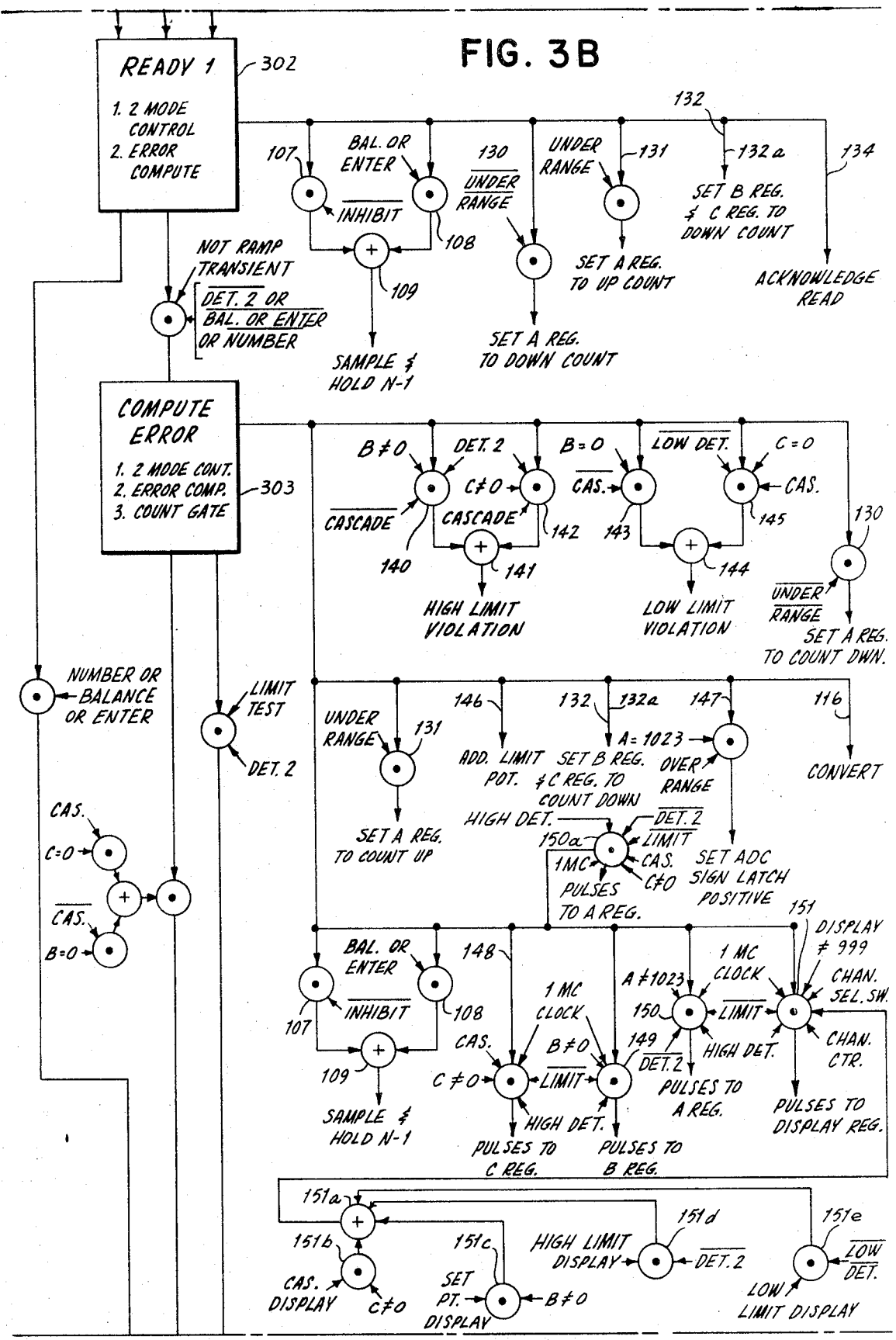
Figure 3C:
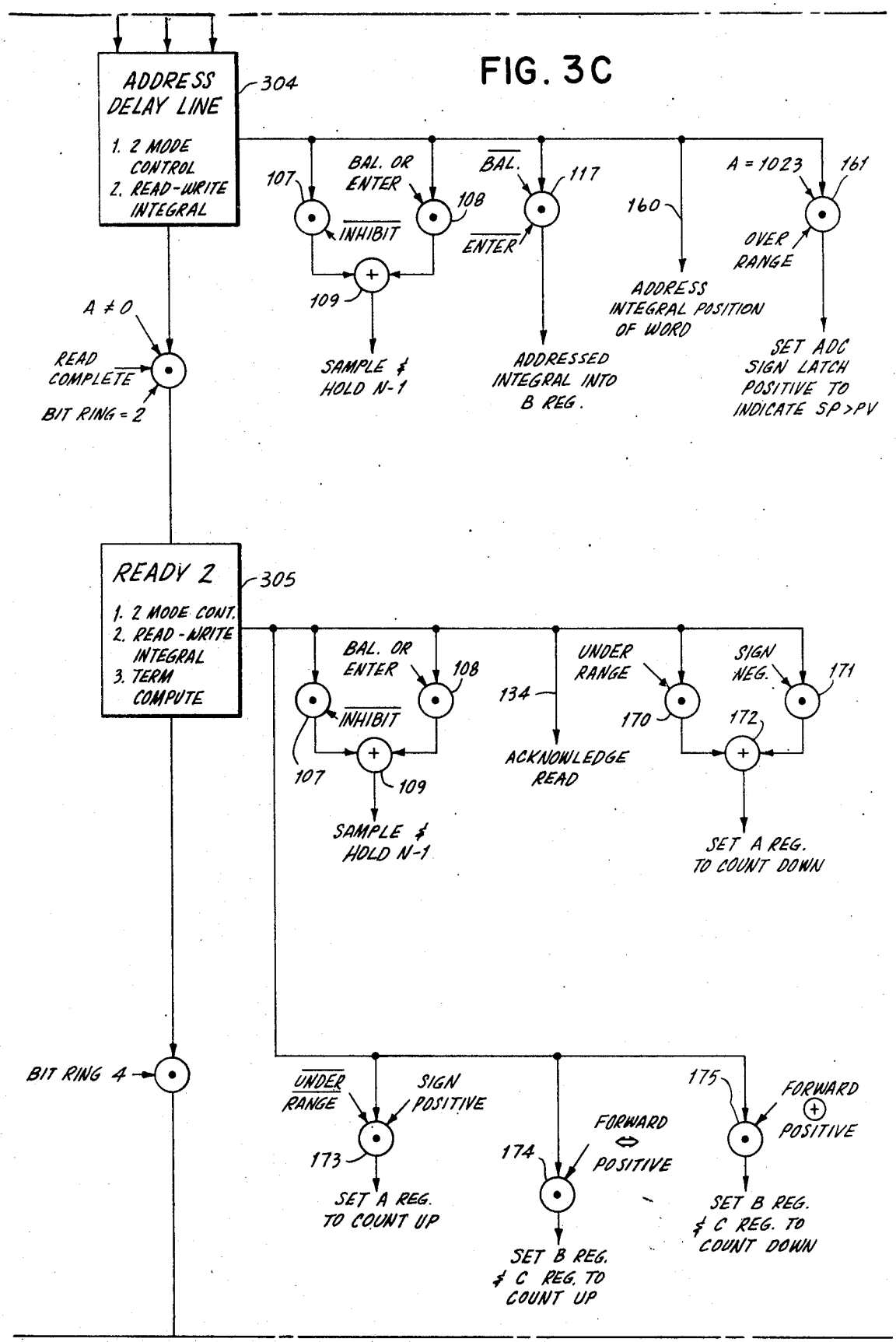

Appropriate provision is further made for the nature of the control being exercised, whether forward or reverse, and for the situation in which the process variable is under range. In the event that either the forward or positive condition obtains, the sign of the ADC sign latch 324 is reversed, causing the A register 28 to count in the opposite direction so as to effectively reverse the sense of subtraction of the process variable with respect to the set point. Similarly, if the under-range latch 85 is set through the gate 118 (FIG. 2B) because the second detector 83 is fired before the first detector 82 in the ADC 26, the A register is set to count up during the computer mode because a negative quantity is in effect represented. The count down or count up relationship at the "up" and "down" input terminals to the A register 28 is established by a set of gates 130, 131 and 170 responsive to the under-range latch (FIG. 2C, FIG. 3A and FIG. 3C).

As a result of these relationships, the system in the compute error mode drives the counts in the A register 28 and B register 35 simultaneously to a state in which the A register contains the error quantity. This error quantity is to be passed through the gain adjustment circuits 33, 34 that introduce the proportionality terms $K_I$ and $K_P$, with the integral term being entered into the B register 35 (FIG. 2D) and the proportional term being entered into the C register 36 (FIG. 2E). At this point the A register 28 is set to count down, and the system enters an "address delay line" mode 304 (FIG. 3C) in which the gate 117 (FIG. 2E) reads the integral from the recirculating storage 30 into the appropriate channel of the B register 35, in the manner previously described with respect to the set point. During this mode and the subsequent "ready 2" mode (FIG. 3C) the various sign adjustments are made (FIG. 3C).

Figure 3D:
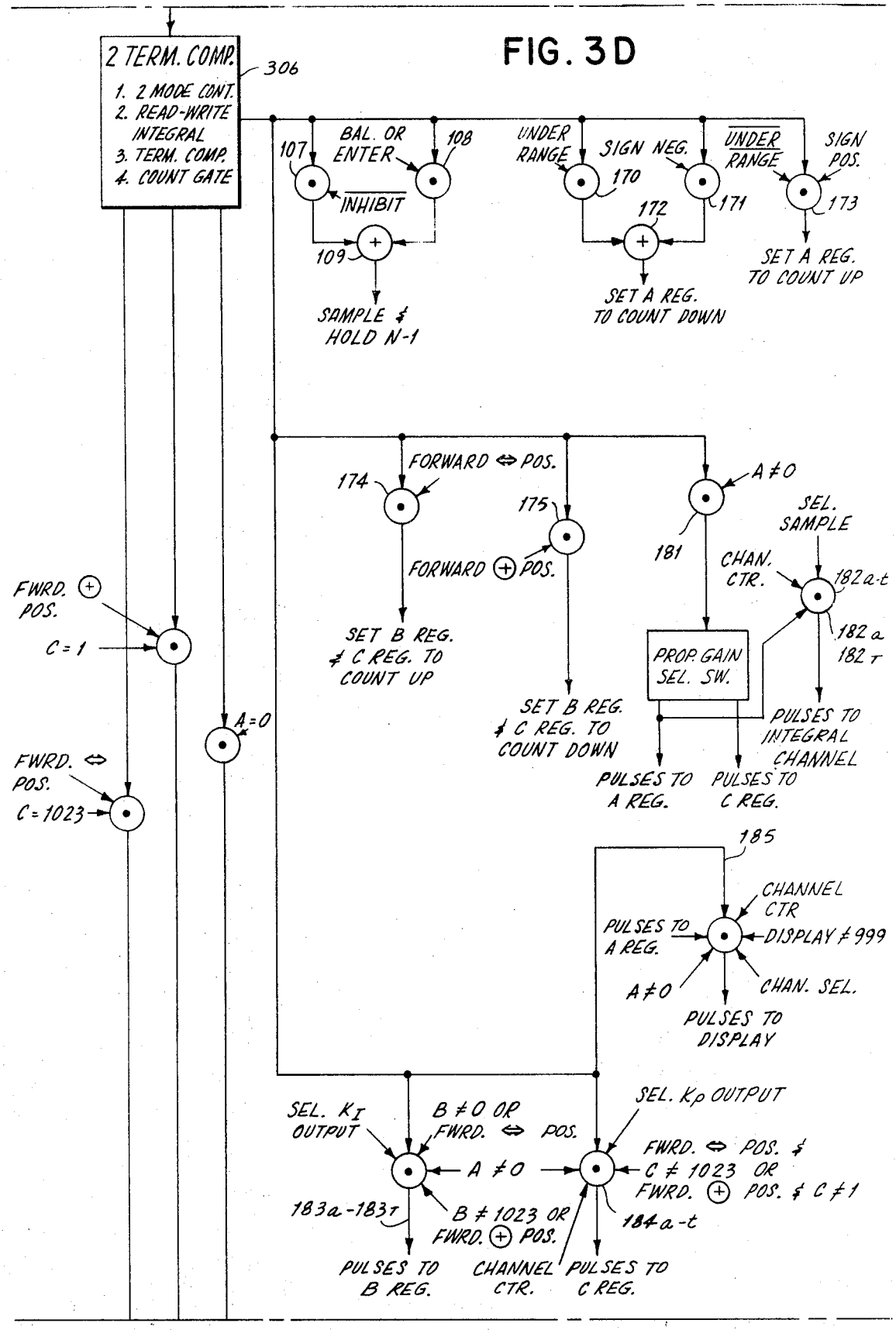

The system therefore is enabled to enter a "two term compute" mode 306, shown in FIG. 3D and principally described with respect to FIG. 2C as well. In FIG. 2C, the proportional gain circuits 33 and the integral gain circuits 34 are seen to receive the clock signal also applied to the count input of the A register 28 from a gate 181 that remains activated until the A register 28 is brought to zero. The proportional gain circuits 33 comprise a pair of digital count division systems, one working from a 1 mc. clock 340, here shown separately from the clock 73 for convenience only, and the other working from a 0.7 mc. clock 342. The 1 mc. clock 340 is gated through a succession of binary count dividers 344, 345, 346 and 347, each providing a further half division of the frequency of the 1 mc. signal, down to a $\frac{1}{16}$ division. The 0.7 mc. clock 342 is passed to a succession of three binary dividers 349, 350, 351, providing a succession of different values of frequency. The amplitude of the error signal in the A register 28 is not only represented by the number of pulses contained therein, but by the duration of the count interval at 1 mc. that is used in returning the A counter 28 to zero. Thus a group of gates 370 at the output terminals of the frequency dividers are controlled in part by the signal derived from an input gate 181. This signal permits a selected one of the gates 370, as controlled by the channel counter 72, a 9 position switch 371 for each channel, to open for a time specifically related to the quantity in the A register 28. A related number of pulses is then provided on the output line through separate gates 184a-t for the channels (FIGS. 2C and 3D) to the C register 36, for summation therein. The selection of a particular value of frequency or count division by actuation of one of the gates 370 may also be controlled by the channel counter 72, through a preset gate network if desired. Alternatively, if desired, a separate proportional gain circuit 33 and integral gain circuit 34 may be utilized for each channel.

When the A register 28 is counted down at the 1 mc. rate, the proportional gain circuits 33 operate as a variable count divider to provide a fractional gain constant.

Through use of a cross-coupling switch 372a–t, however, the 1 mc. clock pulse series may be applied to the C register 36, while the lower pulse rate is applied to the A register 28, to provide a gain constant at a multiplication factor. Thus the number of digitally related gain constants for the proportional gain term is doubled, and the proportional term may be made predominant for chosen control loops.

In the integral gain circuits 34, the number of pulses stored in the A register 28 is utilized in generating the new integral term component derived from the error signal. The integral gain circuits 34a–t, one each channel, include two different frequency division systems, one of which represents the variable frequency switch S2 designated in FIG. 1, and the other of which represents a variable frequency division system. The variable switch is designated as a multi-rate sampler 380, and may be a preset counter operable in response to the 5 c.p.s. clock 74, and effective to open an input gate 182 only once for each predetermined number of times the channel is scanned in succession. A conventional counting and gating system may also be utilized for this purpose, and is of course adjustable to permit selection of this portion of the gain constant. The remaining portion of the integral gain term is determined by a selected count division network 383, 384, 385, here shown as consisting of three stages for simplicity, although any additional number may be used. The integral gain adjustment, therefore, is widely variable over a great range, depending upon the integral gain constant to be used. If a very small fractional gain quantity is to be used as the multiplication term for the error, the multi-rate sampler 380 is closed only once every high number of scans of that channel, opening the gate to pass the pulses representing the error term only during that selected cycle. The number of pulses are further reduced in number in the selectable frequency divider 383, 384, 385, so that the output pulses passed to the B register through the gate 183 contribute only the new component of the total updated integral term to the count of the integral already contained in the B register 35. A rotary switch 387 permits selection of the appropriate division ratio for the channel.

The two term compute mode is completed in either of two ways. When the A register 28 is, in the typical situation, counted down to zero, the count terminates. Both gates 183a–t and 184a–t (FIGS. 2C and 3D) are thereafter deactivated, and the gate controlling entry into the "write storage" mode 307 (FIG. 3E) is activated. Alternatively, if the C register 36 is saturated by reaching zero or a full count, dependent upon whether forward or reverse control is used, further pulses are blocked off from the C register at the gate 184a–t, inasmuch as this indicates that the associated valve will be fully openend or closed. Again, the system advances to the "write storage" mode.

This arrangement has the advantage of providing a high division factor for the integral term, without requiring a long string of dividers. Furthermore, both the integral and proportional gain circuits are alike in form, and operate in response to the quantity contained in the A register, so that no further conversion is needed. This arrangement also enables the proportional quantity to be given any precisely selected increment of gain, while the integral gain can be chosen very small.

Further significant advantages are derived from the essentially digital nature of the integral gain circuits and the digital storage of the integral. Where extremely low gain terms are required, analog systems have been adopted with the consequent disadvantages of drift.

Because the integral is accumulated and stored in digital fashion, an essentially infinite time constant can be utilized, and the integral itself is effectively free from change or error. Thus the same precision need not be applied to each integral increment, because over a period of time such errors will average to zero. In a practical example of a system in accordance with the invention, the integral gain constant may be so low that an increment is added to the integral term only once in a number of hours or even days. Further, the selectable frequency divider 383, 384, 385, provides storage of the accumulated count, so that during the count division none of the pulses passed by the multi-rate sampler 380 are lost despite the lengthy durations of time between passage of samples under the control of the multi-rate sampler 380. With this arrangement, the multirate sampler 380 may be a semi-digital or analog device, such as a staircase generator, if desired.

In the two term compute mode 306 (FIG. 3D) the B register 35 and C register 36 are set to count in appropriate directions by a group of gates 174, 175, 174A and 175A (FIG. 2D). Dependent upon the source of pulses selected in the proportional gain channel, the proportional component is passed through the gate 184 (FIG. 2C and FIG. 3D) to be counted in the C register 36, at the same time the new integral increment is being added in an appropriate sense to the integral term stored in the B register 35.

In the next succeeding mode directly concerned with generation of the control signal, the "transfer integral to C" mode 308 (FIG. 3E), the C register 36 is set to count up, the B register 35 previously having been set to count back down to zero. The 1 mc. clock pulses are applied to a gate 196 (FIG. 2D and FIG. 3E) that continues to pass the clock pulses until the B register 35 returns to zero or the C register 36 is full (reaches 1023). In either event, the count remaining in the C register 36 constitutes the sum of the integral and proportional terms, and represents the control signal in digital form. The digital value is converted to an analog equivalent in the digital to analog converter 40, and is thereafter coupled to the appropriate output terminal in a sequence beginning with the "advance channel-set DAC" mode 309 (FIG. 3F).

In the output circuits, an operational amplifier 390 coupled to the digital to analog converter 40 (FIG. 2E) applies signals through the switches 392 in the output multiplexer 41, the signal level being retained in a storage capacitor 393 for a length of time sufficient to effect proper adjustment of the output controller. During the successive modes from "convert" to "transfer integral to C" the count held in the channel counter 72 represents the selected channel, termed "$n$," but the output multiplexer 41 is arranged to hold the position for the previous ($n-1$) channel, by an arrangement of output switching control gates 395. After these modes have been sequenced, an appropriate gate in the output switching control gates 395 is activated, to close the appropriate switch 392 in the multiplexer 41 and to set the final state of the digital to analog converter 40 into the appropriate output channel to the process system. A capacitor 393 in the holding amplifier circuits 43 is charged to the final level, and maintains the level as a control signal for the output amplifier 396 for the channel, so that the associated controller is responsively adjusted.

ADDITIONAL MODES AND SYSTEM FEATURES

Provision of an appropriate control signal for the particular channel terminates the operation on the channel, and permits the system to proceed to the next channel. The changeover must, however, be accomplished in orderly fashion, resetting the various counters and circuits appropriately, and advancing to the next channel. These desired results are achieved by the modes illustrated in FIGS. 3F and 3G, in conjunction with circuits principally illustrated in FIGS. 2D and 2E.

The system shifts from the "transfer integral to C" mode 308 (FIG. 3E) to the "advance channel-set DAC" mode 309 (FIG. 3F) at BR1 time when the B register 35 is empty or the C register 36 full. The pulses from the bit ring thereafter control the orderly setting and resetting of the various elements, as illustrated graphically in FIG. 3F.

If the forward or positive signal is applied, the C register 36 is reset through the gate 200 (FIG. 3F, FIG. 2E) at BR1 time. At BR2 time, gates 201 and 202 (FIG. 2D) set output inhibit and anti-windup latches 398, 399 respectively. At BR3 time, if the "enter" function is being used, the enter latch 98 (FIG. 2D) is set by a gate 203. At the same time, the digital to analog converter 40 (FIG. 2E) is reset through the gate 205, and the channel counter 72 is advanced through a gate 206. Concurrently, a balanced latch 400 is set if the balance switch 54 (FIG. 2D) is actuated. Both the enter latch 98 and the balance latch 400 signals are used in the initial modes of operation when the selected channel is next addressed. At such time they are reset via the gate 197 (FIGS. 2D and 3E) in the "transfer integral to C" mode.

Channel counter 72 (FIG. 2E) setting depends upon the state of the counter itself. If the channel counter is not at the final, or "number" state, it is advanced at BR3 time through the gate 206 (FIG. 2E). If it is at the "number" state, it is set to one at BR5 time, through actuation of a gate 207. In the majority of instances the counter 72 is not at the first channel, and a gate 208 (FIG. 2D) is actuated at BR9 time, returning the system to the convert mode, while resetting the displays through a gate 208a, and also resetting the A register 28 (FIG. 2C) and resetting the C register 36 through a gate 208d (FIG. 2E). Concurrently, the same signal is utilized to change the ADC sign latch 324 (FIG. 2B) and to provide a function reset signal, as shown by 208b in FIG. 3F.

If, on the other hand, the system is at channel 1, at BR9 time, it shifts to the "interlock" mode, energizing an appropriate individual gate 210a–t (FIG. 2C) to provide another actuating pulse to the multi-rate sampler 380 for each channel. In those channels in which the anti-windup latch 399 has previously been set, as will be described below, passage of a sampled error signal to the system through the integral gain circuits 34 is blocked. The system then returns to the convert mode upon application of the 5 c.p.s. clock signal to a gate 211 (FIG. 3G).

The system uses successive modes, termed the "load state" 311 and the "end load" 312, in conjunction with interlock, depending upon the relationship between the states represented by an interlock latch, a load latch and the two mode control latch. These modes enable external data entered in the registers 319, 406 to be entered into the system. With the two mode control latch off, the B register 35 (FIG. 2D) is reset, along with the channel counter 72 by a gate 220 at BR2 time. Thereafter, if the external computer signals "data available" for the data register 319 (FIG. 2D) and the data register 406 (FIG. 2E) these new characters are entered into the appropriate positions of B register 35 and channel counter 72 at BR3 time through the gates 321 or 222. If only one character for each unit is supplied during the "load state," a gate 223 coupled into the write amplifier circuits 32 is actuated at BR4 time to permit entry of the new data into the recirculating storage 30 in a succeeding cycle of the bit ring counter.

When writing is complete in the storage, the "write complete" signal is provided and the system may return to the interlock mode, to receive and enter new characters. If no new characters are provided, a new sequence is started when the 5 c.p.s. clock is applied. If the 5 c.p.s. arrives prior to "write complete" the system shifts into "end load" and completes writing, then enters the "convert" mode. Despite the fact that there may be time to enter a sequence of new set points for different channels, while shifting between "interlock" and "load state," only the first activation of the interlock latch causes pulsing of those multi-rate samplers for which anti-windup latches were not previously set.

The application of the 5 c.p.s. clock signal resets the interlock latch, shifting to the end load mode 312 (FIG. 3G) and then to the convert state when the write complete signal is provided.

DISPLAY FUNCTIONS

The display register 99 (FIG. 2C) is separate from the alarm indicators 89 and limit indicators 92 (FIG. 2A), which merely indicate the channel in which a corresponding alarm or limit condition has been identified. The display register 99 receives a pulse series representative of a particular manifestation, and converts this to a three position decimal indication of the particular value under analysis. A number of different displays may be selected and presented under control of the channel selection switch 52 (FIG. 2D). Setting of the switch 52 to the "high alarm" position activates this part of the display for a chosen channel. In FIG. 2B, three gates 101, 102 and 103, pass pulses to the display register 99 representative of the high alarm, the process variable and the low alarm values, respectively. The high alarm display gate 101 is actuated to pass the 1 mc. clock pulses during the interval between the actuation of the high detect circuit 80 (FIG. 2A) and the second detector 83. Similarly, the low alarm display gate 103 is actuated in the interval between the firing of the low detect circuit 81 and the firing of the second detector 83. Thus an operator may select the high alarm display or the low alarm display, and adjust the potentiometers 61 or 63 with relation to the decimal indication of the values being attained during the adjustment.

Pulses passed through the gate 102 represent either the set point adjustment or the process variable display, as selected by the operator. These pulses are passed during the time interval between the firing of the first detector 82 and the second detector 83, dependent of course upon whether the number of potentiometer 71 is being used as the input signal, or whether the output signal from the sensor for the processor is being so employed.

The system can provide a number of different displays during the compute error mode, under control of a primary gate 151 and a number of secondary gates 151a–e (FIG. 2C), and can further provide an indication of the magnitude of the error signal during the two term compute mode, under control of a gate 185. The gate 151 passes pulses for an appropriate channel, after the high detector is fired and until a limit indication is provided, or when one of a number of other events, as determined by the group of secondary gates 151b through 151e, occurs. When the low limit display is selected, by actuation of one input of a gate 151e, the count accumulates until the low detector fires, which establishes the actual lower operating limit. For the high limit display, established by gate 151d, the count continues until the second detector fires. If a set point display is chosen, the gate 151c is deactivated when b returns to zero. Finally, when display for the cascade feature is chosen, the count is terminated when the C register returns to zero. The actual error signal may be represented in digital form on the display register by use of the gate 185 during the two term compute mode, when it is activated by the clock pulses from the 1 mc. or .7 mc. source derived through the proportional gain circuits 33 until the A register 28 returns to zero.

CONTROL OF SIGN OF THE SUMMING REGISTERS

The signs of the various registers 28, 35, 36 are individually controlled to provide the appropriate arithmetic relationship during the summation of the various totals used in the different modes. The A register 28 is caused to operate in response to the under-range relationship by a group of gates 130, 131, 170, 171 and 173 (FIG. 2C), in response to the over-range condition by gates 147, 161 (FIG. 2B), and in response to the selection of forward or reverse modes, as determined by an ADC sign latch 324. In the convert mode the A register 28 normally counts up, by virtue of application of a pulse to the "count up" input line 105. At the same time, the ADC sign latch 324 is set negative, conditioning the gate 171 (FIG. 2C) for the system to count down on shifting to the succeeding "ready 2" or "two term compute" modes. The use of the ADC sign latch 324 permits the sign to be changed automatically in a convenient fashion, while simplifying the gating arrangement. If, after counting the process variable into the A register 28 during the convert mode the under-range condition is identified, the sign is set positive by the gate 118 (FIG. 2B and FIG. 3A). The B register 35 is also set through the gate 105 to count up during the convert mode. During the "ready 1" mode 302 (FIG. 3B) the B register is set to count down under control of the gate 132. The C register 36 (FIG. 2E) is set to count down under control of the gate 132a at the same time. Also in the "ready 1" mode, the A register 28 is set to count up by a gate 131 if the under-range condition is identified, and to count down if no under-range exists, under control of the gate 130. In effect, the complement of the count in the A register is utilized during the counting of the B and C registers. During the compute error mode 303 (FIG. 3B) the presence of an over-range signal is utilized at the gate 147 (FIG. 2B) to set the sign latch 324 positive if the A register reaches a full normal count of 1023. Note that the gates 130–132 are also actuated again during the compute error mode, and are separately illustrated in conjunction with block 303 in FIG. 3B.

In the address delay line mode 304 (FIG. 3C) actuation of the gate 161 (FIG. 2B), sets the ADC sign latch 324 positive to indicate that the set point in the B register 35 is greater than the process variable value in the A in register 28.

In the "ready 2" and "two term compute" modes 305 and 306 (FIGS. 3C and 3D) the gates 170–173 control the direction of count of the A register 28 in response to the state of the under-range and sign values, and the gates 174 and 175 control the direction of count of the B and C registers 35, 36 in response to the forward and positive state relationships. The over-range condition and under-range condition do not exist concurrently, so that the gate 173 (FIG. 2C) affects the direction of count only if the under-range condition is detected (gate 170 in FIG. 2C) or the sign is determined to be negative (gate 171 in FIG. 2C). The direction of counts of the B and C registers, however, may be reversed depending upon whether the forward ⇌ positive signal, or its inverse, is provided to gate 175, so that these registers count down. If the inverse condition is true, then gate 174 (FIG. 2D) is activated, to set the B register and C register to count up. These gating arrangements therefore ensure that the proper sign of the quantity in the A register is used during operation on the error signal, and that the signs of the quantities in the B and C registers properly represent the sense of the error signal and whether forward or reverse control is used.

In the write storage mode 307 (FIG. 3E) the C register is set to count up by a gate 190 (2E) in anticipation of the subsequent transfer of data into the C register. The B register 35 (FIG. 2D) is concurrently set to count down by the gate 132. At this point in time in the sequence the updated integral has been entered into the B register, and the proportional increment of the control signal has been entered into the C register. The sign may vary dependent upon whether the proportional increment represents a negative quantity, or a positive quantity. In any event, the integral contained in the B register 35 represents a positive quantity so that the B register is set to count down under control of the gate 132 (FIG. 2D) and the C register 36 (FIG. 2E) is set to count up. The same conditions apply in the "transfer integral to C" mode 308 (FIG. 3E), but the sign at the ADC sign latch 324 (FIG. 2B) is changed if the forward or positive signal is provided, and the contents of the C register are equal to zero. At the termination of the "advance channel mode" 309 (FIG. 3F) the ADC sign latch 324 is set negative by the gate 106 (FIG. 2B), in preparation for the succeeding "convert" mode.

WINDUP LIMITING

Dependent upon the relationship of proportional to integral gain constants, and the magnitude of fluctuation of a process variable, the process control system may seek at times to maintain a valve fully opened or closed. This may result from the proportional component of the control signal alone, or from both terms. If this happens, the valve must simply remain fully open or closed, depending upon the interaction with the specific controlled variable, until such time as the process variable is again within controllable limits. Because of the cumulative effect introduced when an integral term is employed in computation, such a situation can give rise to a "windup" condition, with resultant accumulation of the integral and indefinite increase in the control quantity. When windup exists, the control signal remains at its limit because of the large accumulated integral, and may tend to force a correction in the wrong direction or sense, after the system has returned to a suitable operating range, thus making the system unstable.

The present arrangement effectively minimized these difficulties, and permits the "windup" condition to be obviated in any one or more of several different ways. Because the proportional quantity is fed into the C register 36 prior to the updated integral, the proportional quantity alone may cause the associated controller to assume a limiting position. In the simplest example, if the C register is full, at a count of 1023 (or empty at a count of 0 or 1) and the associated controller is fully opened, no further accumulation of control signal need be utilized. The "anti-windup latch" 399 (FIG. 2D) may be set during the two term compute mode, and this may be utilized to bypass the subsequent "transfer integral to C" mode 308 (FIG. 3E), if desired. When so used, the latch 399 effectively prevents the windup condition by blocking the time sampling of pulses in the integral gain channel 34 until such time as the proportional error signal decreases. A different limitation on the windup condition can be introduced simply by terminating the application of the integral to the C register 36 when the C register is filled.

A different anti-windup expedient is illustrated in the present system, which simply terminates the "transfer integral to C" mode 308 when the C register is filled to 1023. The gate 202 (FIG. 2D) sets the anti-windup latch 399a–t with the "advance channel" signal, which occurs at BR2 immediately following BR1, and the windup latch 399 for that particular channel thereafter remains set. Reset of the latches 399a–t is accomplished when the $C \neq 0$ or $C \neq 1023$ conditions no longer prevail. When the system reaches the interlock mode 310 (FIG. 3G), all of the multi-rate samplers 380 except those in the channels in which the windup latches have been set, are advanced by one through the gates 210a–t (FIG. 2C and FIG. 3G). Thus, on the succeeding scan the integral component is not accumulated if the proportional component alone or the combined value in the C register 36 causes limit condition to be reached.

Figure 3E:
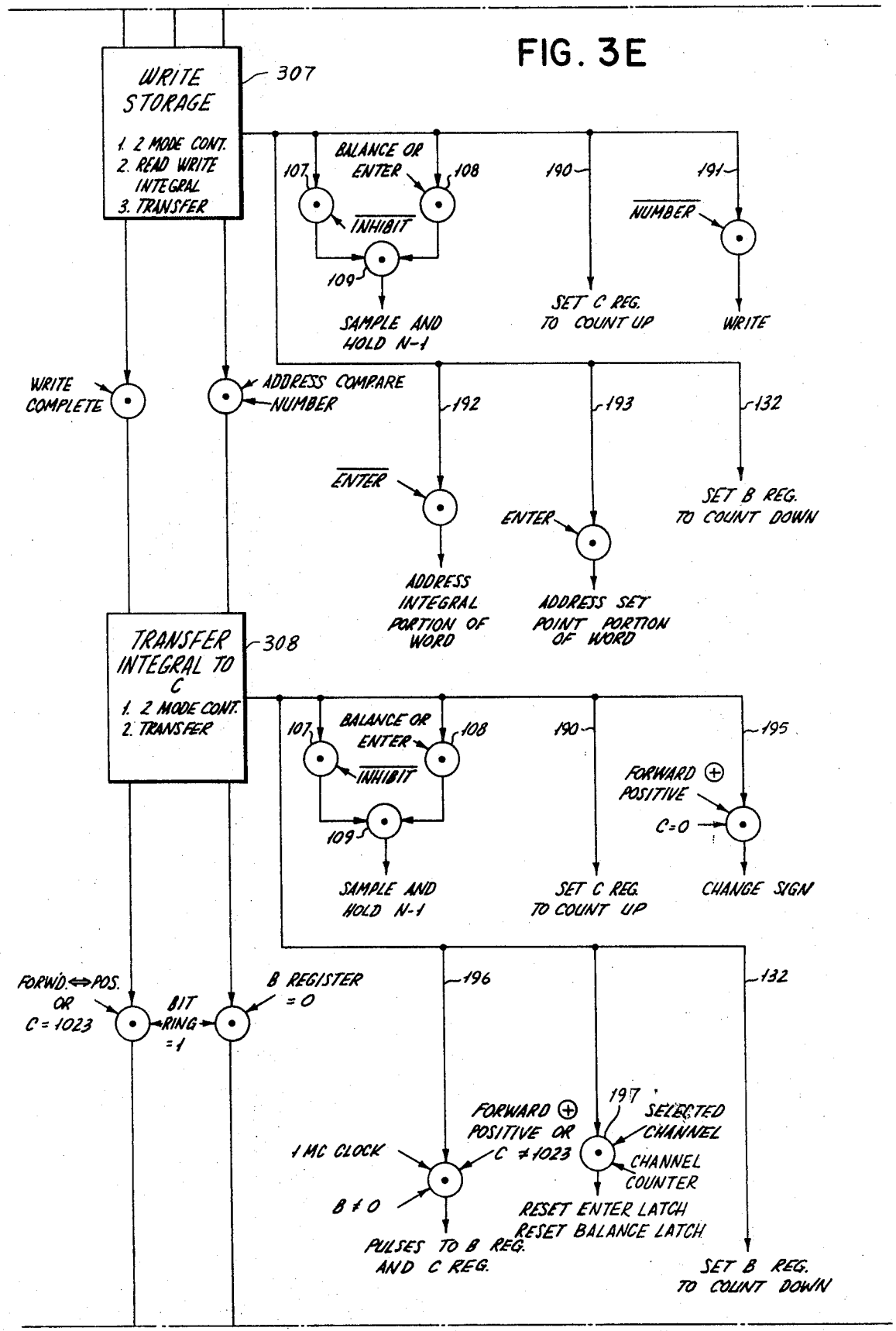

A separate limitation on control signal accumulation is employed that does not employ the anti-windup latch 399. For this purpose the system uses gates 184a–t (FIG. 2C) and the gates which determine the changes of state between the two term compute mode 306 (FIG. 3D) and the write storage mode 307 (FIG. 3E). If the value in the C register 36 goes to one (1) in the two term compute mode, with forward or positive control (or reaches 1023 with the inverse directional control) the appropriate gate 184a–t is inactivated to prevent the application of further pulses to the registers. Concurrently, the system shifts into the write storage mode 307, and subsequently through the transfer integral to C mode 308, causing the system to enter the contents of the B register 35 as the updated integral in the storage, but bypassing further accumulation of the error in the B register 35. This integral limiting feature operates until the proportional term decreases to a level at which the integral may again have some effect.

BALANCE OF AUTOMATIC TO MANUALLY CONTROLLED OUTPUT SIGNALS

In any modern digital process control system it is desirable to effect a transient-free or "bumpless" transfer between manual control by the adjustable output potentiometers 65 (FIG. 2E) and the automatically generated control signal when the system switches into automatic operation. In the present system, this desirable result of bumpless transfer is effected by use of the manually adjusted signal level to determine the integral value obtained and utilized from the storage system.

With the system in the manual mode, the output switches 66 couple the analog signal determined by the setting of the potentiometer 65 to the process system by direct connection. With the channel selector switch 52 at the desired channel, the "balance" switch 54 is closed. At the input end of the system, FIG. 2A, the balance signal provided energizes a driver circuit 403 during the convert mode to couple signals into the analog to digital converter 26 from the alternate contacts of the channel selector switch 52′ coupled to receive the signals applied to the controllers. A switch 402 operated by a driver 403 responsive to the gate 113 couples this input signal directly to the first detector 82. Thus, for the given channel only, the output signal appears at the input terminal when the balance latch 400 is on. In this situation, the gate 104 (FIGS. 2B and 3A) is activated by the balance signal, and the pulse train output from the analog to digital converter 26 is provided to the B register 35, and not to the A register in which the process variable is ordinarily entered. As soon as the first and second detectors 82, 83 have both fired, the system shifts from the convert mode 301 (FIG. 3A) directly through the "ready 1" mode 302 (FIG. 3B) to the compute error mode 303. During the entire interval of operation to perform the balance function, the system holds the output signal from the previous channel, by operation of the gates 107, 108, 109 controlling the output switch control gates 395. Normally, the result of the computation sequence is actuation of a signal at the DAC 40 after the "advance channel" mode has been reached. Here, however, the channel counter 72 is advanced, but no "sample and hold" signal passes the gates 107–109.

During the generation of the error signal equivalent to the manually adjusted output level, no set point is read into the B register because the gate 117 (FIG. 3A and FIG. 2E) is disabled due to the balance term being true. At this point in the sequence, therefore, the contents of the B register are available for subsequent use as the new updated integral. Similarly, during the "address delay line" mode 304, the addressed integral value in the storage is not read into the B register because the gate 117 remains disabled. Consequently, the system can shift through the "ready 2" mode 305 (FIG. 3C) into the two term compute mode 306. The error value normally contained in the A register is zero, and the system immediately shifts to the write storage mode 307 (FIG. 3E). The gate 191 (FIG. 2E) thus transfers the new updated integral value into the recirculating storage, and that value is thereafter available for use. On the next scan of the same channel, the new integral value is read out, and is suitable for use as the control signal, because an output signal is generated that is substantially identical to that provided from the output potentiometer 65.

CASCADE

It is often highly desirable, in a process control system, to be able to utilize a "cascade" feature, in which the value of a control signal in one channel is utilized to affect the setting in an adjacent channel. Where a number of variables are arranged in close juxtaposition in this fashion, this permits a close interrelation between variables to be maintained under control of the operator or automatically.

The cascade function is principally concerned with the compute error mode 303 (FIG. 3B). It will be observed, with reference to gates 142 and 145 (FIGS. 2B and 3B) that the contents of the C register 36 are compared relative to the second detector 83 and the inverse state of the low detector 81. If the C register 36 goes to zero prior to firing the low detector 81, a low limit violation is signalled, whereas if the second detector 83 fires prior to the C register 36 going to zero, a high limit violation is signalled. The pulses supplied to the A register 28 and the C register 36 are controlled by the gates 150a and 148 (FIGS. 3B, 2C and 2D). The C register 36 is counted down to zero through gate 148, shifting its value into the A register 28 through the gate 150a. A different value is entered only if a limit is detected or the second detector 83 fires. When the C register 36 goes to zero, the system also shifts out of the "compute error" mode 303 (FIG. 3B) into the "address delay line" mode 304 (FIG. 3C). In FIG. 2C, the gate 151b passes a conditioning signal to the gate 151 controlling the application of pulses to the display register 99. Because of the fact that the gate 208d (FIG. 3F and FIG. 2E) does not permit resetting of the C register 36 in the cascade mode, the C register 36 retains the contents of the prior scan of the immediately previous channel, being counted down with respect to the limits detected in the analog to digital converter 26.

FORWARD–REVERSE CONTROL ACTION

The polarity of the output signal to the process is determined by the position of forward-reverse switches 67. These operate to control the direction of the count during two term compute.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a digital process control system utilizing a stored set point for reference in the generation of a control signal for a process variable, a system for manually adjusting actual operating set point during limits automatic operation including the combination of:

storage means for providing a digital set point value;
first adjustable analog means providing a variable value for defining a maximum set point value;
second adjustable analog means for providing a variable value establishing the span;
analog to digital converter means coupled to said storage means and both said adjustable analog means for providing successive digital quantities representative of the set point limits, and
  gating means responsive to the stored set point value and said successive digital quantities for providing a set point limited by said selected span,
  whereby variation of said second adjustable analog means shifts the set point span to effect direct control of the operating range of the set point.

2. The invention as set forth in claim 1 above, wherein the stored set point value is provided as a pulse series of a selected periodicity and total count, and wherein said successive digital quantities are each provided as pulse series of like periodicity and initiated concurrently with the pulse series representing the stored set point value.

3. A digital process control system providing automatic limiting of set point values to a selected range, including:

means providing a digital set point quantity;
  means including clock means for counting said digital set point quantity at a selected rate to define a first variable time interval, the duration of which is dependent upon the quantity;

analog means providing at least a pair of signal levels representative of a selected set point range;

means responsive to the relative amplitudes of the signal levels from the analog means for defining a second variable time interval normally spanning the termination of said first time interval, and means responsive to the relationship of the termination of said first time interval to said second time interval to provide an adjusted digital quantity at the selected rate by having a minimum or maximum value determined by the selected set point range if the set point quantity is not within said range.

4. A digital process control system providing automatic limiting of set point values to a selected range, including:

analog means providing first and second signals representative in level of the limits of a selected set point range;

means providing a set point quantity;

means for converting the set point quantity to a first pulse series provided at a selected clock rate;

means responsive to the relative amplitudes of the first and second signals for providing a variable time duration signal having initiating and terminating times defining minimum or maximum values for the set point quantity, and means responsive to the variable time duration signal and the first pulse series termination for providing an adjusted pulse series at the selected clock rate, the number of pulses in said series corresponding to an automatically limited set point value.

5. A digital process control system for providing automatic limiting of set point values to a selected range, including:

counter means providing a digital set point quantity;

clock means for providing a pulse series of a selected periodicity;

gating means coupled to said counter means and said clock means for providing a corresponding number of pulses at the selected periodicity;

analog means including at least three potentiometric means providing three signal levels of progressively lower amplitudes, a first being representative of a starting point, a second being representative of a selected low set point limit, and a third being representative of a selected high set point limit;

analog to digital converter means of the type including means generating a linearly descending ramp signal;

said converter including first, second and third amplitude comparators each providing a firing signal, on the coincidence in amplitude of a pair of signals applied thereto, the first amplitude comparator being coupled to receive the ramp signal and the signal from the first potentiometer, the second amplitude comparator being coupled to receive the ramp signal and the signal from the second potentiometer, and the third comparator being coupled to receive the ramp signal and the signal from the third potentiometer, and the analog to digital converter further being coupled to the clock means and the gating means to provide a pulse series to said counter means initiated with the firing of said first comparator;

and said gating means further including means for terminating the pulse series (1) when the counter reaches a selected count between the firing of the second and third detector, (2) when the second detector fires, if the counter has first reached the selected count, and (3) when the third detector fires, if the counter has not then reached the selected count.

6. For a digital process control system, a system for modifying a set point signal with respect to a process variable signal to establish particular limits with respect to the set point, and comprising:

ramp generator means for establishing a time base signal;

first variable voltage means providing an amplitude representative time base level;

second variable voltage means providing an amplitude representative span level and third variable voltage means providing an amplitude representative terminating level;

first, second and third amplitude comparator means coupled to the ramp generator means and each to a different one of the respective first, second and third variable voltage means, and firing in accordance with an equality relationship between the signal from the potentiometer means and the ramp generator means;

means providing a high frequency clock signal;

gating means responsive to the high frequency clock signal and to the first comparator means for initiating a digital pulse series;

register means responsive to the chosen set point value for indicating when the number of counts in the digital pulse series equals the chosen set point;

and means responsive to the indication of the equality of the chosen set point and to the firing of the second and third comparators for terminating the count at the firing of the second comparator if the equality relationship occurs first, terminating the count at the equality relationship if it occurs between the firing of the second and third comparators, and terminating the count at the firing of the third comparator if the equality relationship does not previously occur.

References Cited
UNITED STATES PATENTS 3,391,275 7/1968 Bullock et al. _____ 235—151.1
3,348,234 10/1967 Foster _____ 340—213 X EUGENE G. BOTZ, Primary Examiner U.S. Cl. X.R.

235—152, 156; 340—213

PO-1050
(5/69)

UNITED STATES PATENT OFFICE
CERTIFICATE OF CORRECTION

Patent No. 3,519,807           Dated June 23, 1970

Inventor(s) James O. Jacques and Richard K. Oswald

It is certified that error appears in the above-identified patent and that said Letters Patent are hereby corrected as shown below:

Column 20, line 45, after "set point", "during limits" should read --limits during--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents